(12) United States Patent
Li et al.

(10) Patent No.: US 8,850,364 B2
(45) Date of Patent: Sep. 30, 2014

(54) METHOD AND DEVICE FOR SENDING FILE DATA

(71) Applicant: Huawei Technologies Co., Ltd., Shenzhen (CN)

(72) Inventors: Dongyuan Li, Shenzhen (CN); Fenglong Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/029,980

(22) Filed: Sep. 18, 2013

(65) Prior Publication Data
US 2014/0019874 A1 Jan. 16, 2014

Related U.S. Application Data

(63) Continuation of application No. PCT/CN2012/078959, filed on Jul. 20, 2012.

(30) Foreign Application Priority Data

Feb. 20, 2012 (CN) .......................... 2012 1 0038446

(51) Int. Cl.
G06F 3/033 (2013.01)
H04W 24/00 (2009.01)
G06F 3/041 (2006.01)
H04L 29/08 (2006.01)
G06F 3/0488 (2013.01)
G06F 3/0481 (2013.01)
H04M 1/725 (2006.01)
G06F 1/16 (2006.01)

(52) U.S. Cl.
CPC ............ H04L 67/06 (2013.01); G06F 3/04883 (2013.01); G06F 3/04817 (2013.01); H04M 1/7253 (2013.01); H04L 67/36 (2013.01); G06F 1/1694 (2013.01); H04L 67/32 (2013.01); H04M 2250/12 (2013.01); H04M 2250/22 (2013.01); H04M 2250/64 (2013.01)
USPC .......................... 715/863; 455/456.1; 345/173

(58) Field of Classification Search
CPC ............ G06F 3/04817; H04M 1/7253; H04M 2250/22
USPC ................. 715/863, 852; 455/456.1; 345/173
See application file for complete search history.

(56) References Cited

U.S. PATENT DOCUMENTS 8,457,651 B2 * 6/2013 Forutanpour et al. ....... 455/456.1
8,464,184 B1 * 6/2013 Cook et al. ..................... 715/863

(Continued)

FOREIGN PATENT DOCUMENTS

CN 101415095 A 4/2009
CN 101494691 A 7/2009

(Continued)

OTHER PUBLICATIONS

Foreign Communication From a Counterpart Application, PCT Application No. PCT/CN2012/078959, Chinese Search Report dated Nov. 29, 2012, 7 pages.

(Continued)

Primary Examiner — Haoshian Shih
(74) Attorney, Agent, or Firm — Conley Rose, P.C.; Grant Rodolph; Nicholas K. Beaulieu

(57) ABSTRACT

Embodiments of the present invention relate to a method and a device for sending file data. The method comprises: obtaining a shift that is relative to an initial position of a to-be-sent file and is generated when a representative to-be-sent file shifts in a display area; determining whether a position of the to-be-sent file after the shift exceeds a preset position; and if the position of the to-be-sent file after shifting reaches or exceeds the preset position, sending the to-be-sent file to a corresponding receiving terminal.

19 Claims, 20 Drawing Sheets

(56) References Cited

U.S. PATENT DOCUMENTS

| | | | |
|---|---|---|---|
| 2008/0168384 A1 | 7/2008 | Platzer et al. | |
| 2009/0106666 A1 | 4/2009 | Nomura | |
| 2009/0140986 A1 | 6/2009 | Karkkainen et al. | |
| 2010/0122195 A1 | 5/2010 | Hwang | |
| 2010/0156812 A1 | 6/2010 | Stallings et al. | |
| 2010/0165965 A1* | 7/2010 | Carlton et al. | 370/338 |
| 2011/0081923 A1 | 4/2011 | Forutanpour et al. | |
| 2011/0136544 A1 | 6/2011 | Ge et al. | |
| 2011/0163944 A1* | 7/2011 | Bilbrey et al. | 715/863 |

FOREIGN PATENT DOCUMENTS

| | | | |
|---|---|---|---|
| CN | 101578578 | A | 11/2009 |
| CN | 101594369 | A | 12/2009 |
| CN | 101616389 | A | 12/2009 |
| CN | 101739127 | A | 6/2010 |
| CN | 101945499 | A | 1/2011 |
| CN | 102088299 | A | 6/2011 |
| CN | 102271179 | A | 12/2011 |
| CN | 102298456 | A | 12/2011 |
| CN | 102346618 | A | 2/2012 |
| EP | 2387202 | A1 | 11/2011 |

OTHER PUBLICATIONS

Foreign Communication From a Counterpart Application, PCT Application No. PCT/CN2012/078959, Chinese Written Opinion dated Nov. 29, 2012, 6 pages.

Foreign Communication From a Counterpart Application, Chinese Application No. 201210038446.4, Chinese Search Report dated May 27, 2013, 5 pages.

Foreign Communication From a Counterpart Application, Chinese Application No. 201210038446.4, Chinese Office Action dated Oct. 25, 2013, 6 pages.

Partial English Translation and Abstract of Chinese Patent Application No. 102346618, Dec. 18, 2013, 3 pages.

Partial English Translation and Abstract of Chinese Patent Application No. 101945499, Dec. 18, 2013, 4 pages.

Partial English Translation and Abstract of Chinese Patent Application No. 102271179, Dec. 18, 2013, 5 pages.

Partial English Translation from Google Translate, Chinese Patent Application No. 102298456, http://www.google.com/patents/CN102298456A?cl=zh, May 8, 2014, 11 pages.

Partial English Translation from Google Translate, Chinese Patent Application No. 102346618, https://www.google.com/patents/CN102346618A?cl=en, May 9, 2014, 7 pages.

Partial English Translation from Google Translate, Chinese Patent Application No. 101945499, https://www.google.com/patents/CN101945499A?cl=en&dq=, May 9, 2014, 8 pages.

Partial English Translation from Google Translate, Chinese Patent Application No. 102271179, http://www.google.com/translate?hl=en&sl=zh-CN&u=http://www.google.com/patents/CN102271179A, May 9, 2014, 8 pages.

Foreign Communication From a Counterpart Application, European Application No. 12869024.5, Extended European Search Report dated Mar. 3, 2014, 11 pages.

* cited by examiner

METHOD AND DEVICE FOR SENDING FILE DATA

CROSS-REFERENCE TO RELATED APPLICATIONS

This application is a continuation of International Application No. PCT/CN2012/078959, filed on Jul. 20, 2012, which claims priority to Chinese Patent Application No. 201210038446.4, filed on Feb. 20, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and a device for transmitting file data.

BACKGROUND

Currently, for the transmission of most files, an operator of a computer must click multiple times to search for a computer, a mobile phone or a tablet computer that may be connected in an external network environment, and sends a file through duplicating and pasting the file.

In the prior art, the Windows operating system and software all need a user to manually connect a computer at an opposite side, and if the computer at the opposite side is not online, the copying cannot be implemented. The user needs to find an available connection to perform subsequent transmission and sharing.

The disadvantage of the prior art lies in that: the user must first manually search a file system of a computer for a related apparatus that is connected to the computer, such as another computer, mobile phone or tablet computer; several operations are needed, and the user has to have some understanding on the knowledge about the computer apparatus connection; and during the process of file transmission, operations such as duplicate, paste, and copy are used, and the user can understand and complete the operations only through learning. Therefore, the method for sending a file in the prior art is inconvenient in operation for the user.

SUMMARY

In order to implement the foregoing objective, embodiments of the present invention disclose a method and a device for sending file data, so as to send a file conveniently and correctly even when a user is unfamiliar with the knowledge about the computer apparatus connection.

In a first aspect, an embodiment of the present invention discloses a method for sending file data, the method includes: obtaining a shift that is relative to an initial position of a to-be-sent file and is generated when a representative to-be-sent file shifts in a display area; determining whether a position of a to-be-sent file after the shift exceeds a preset position; and if the position of the to-be-sent file reaches or exceeds the preset position after shifting, sending the to-be-sent file to a corresponding receiving terminal.

In a second aspect, an embodiment of the present invention discloses another method for sending file data. The method includes: determining whether a to-be-sent file is in a user browsing state; if the to-be-sent file is in the user browsing state, recording a current position of the to-be-sent file being browsed by a user, and dividing the to-be-sent file into a browsed part and a non-browsed part by using the current position of the to-be-sent file being browsed by the user as a point of division, where a part before the point of division corresponds to the browsed part, and a part after the point of division corresponds to the non-browsed part; and sending the non-browsed part of the divided to-be-sent file to a receiving terminal.

In a third aspect, an embodiment of the present invention discloses a device for sending file data. The device includes: an obtaining unit configured to obtain a shift that is relative to an initial position of a to-be-sent file and is generated when the representative to-be-sent file shifts in a display area; a comparison unit configured to determine whether a position of the to-be-sent file after the shift exceeds a preset position; and a first sending unit configured to: if the position of the to-be-sent file reaches or exceeds the preset position after shifting, send the to-be-sent file to a corresponding receiving terminal.

In a fourth aspect, an embodiment of the present invention discloses a device for sending file data. The device includes: a determining unit configured to determine whether a to-be-sent file is in a user browsing state; an execution unit configured to: if the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part; and a first sending unit configured to send the non-browsed part of the divided to-be-sent file to a receiving terminal.

By applying the method and device for sending file data disclosed in the embodiments of the present invention, interaction with an adjacent similar apparatus may be implemented through a translational touch or rotational touch of the user. Moreover, the security of subsequent communications may be analyzed according to a historical record of the communications, so that file data sharing is simple and natural.

DETAILED DESCRIPTION

In order to illustrate the technical solutions and advantages according to the embodiments of the present invention more clearly, the technical solutions are further described in detail through accompanying drawings and embodiments.

Figure 1:
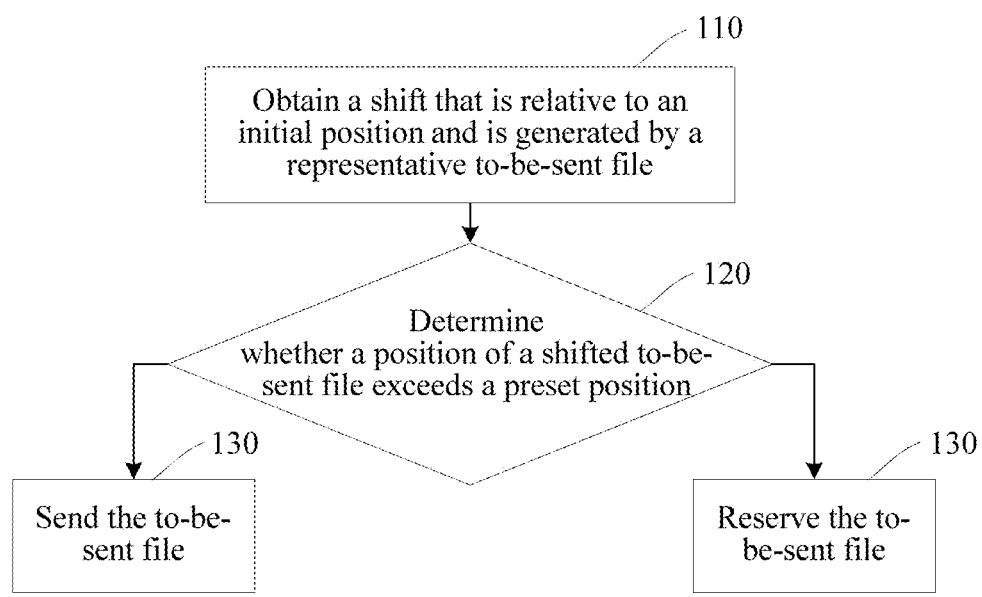
FIG. 1 is a flow chart of a method for sending file data disclosed in an embodiment of the present invention.

A method for sending a file disclosed in an embodiment of the present invention is described in detail by taking FIG. 1 as an example, and FIG. 1 is a flow chart of a method for sending a file disclosed in an embodiment of the present invention.

As shown in FIG. 1, first, a displacement, which is relative to an initial position of a to-be-sent file and is generated when a representative to-be-sent file shifts in a display area, is obtained, and a specific determination of whether to send the file is made according to whether the generated shift exceeds a preset position. The implementation steps are as follows:

Step 110: Obtain a shift that is relative to an initial position of a to-be-sent file and is generated when the representative to-be-sent file shifts in a display area.

Specifically, a user first selects, on a mobile terminal, the to-be-sent file that is shared with a receiving terminal, and when the user touches a touch area of the to-be-sent file, the shift relative to the initial position of the to-be-sent file is generated along with the slide of the to-be-sent file.

Step 120: Determine whether a position of a to-be-sent file after the shift exceeds a preset position.

Specifically, the relocated position of the touch area, which corresponds to the file to be sent and is touched by the user, is compared with a preset position, if the relocated position of the touch area, which corresponds to the file to be sent and is touched by the user, exceeds the preset position, the to-be-sent file is sent; and if the position after the shift generated by the user touching the touch area of the to-be-sent file does not exceed the preset position, the to-be-sent file is reserved.

Step 130: If the shifted position of the to-be-sent file reaches or exceeds the preset position, send the to-be-sent file to a corresponding receiving mobile terminal.

Specifically, according to the comparison determination of step 120, if the position after the shift generated by the user touching the touch area of the to-be-sent file exceeds the preset position, it is determined that the to-be-sent file needs to be sent to the corresponding receiving mobile terminal.

According to the comparison determination of step 120, if the position after the shift generated by the user touching the touch area of the to-be-sent file does not exceed the preset position, it is determined that the to-be-sent file does not need to be sent to the corresponding receiving mobile terminal, and the to-be-sent file is still reserved in the mobile terminal.

Figure 2:
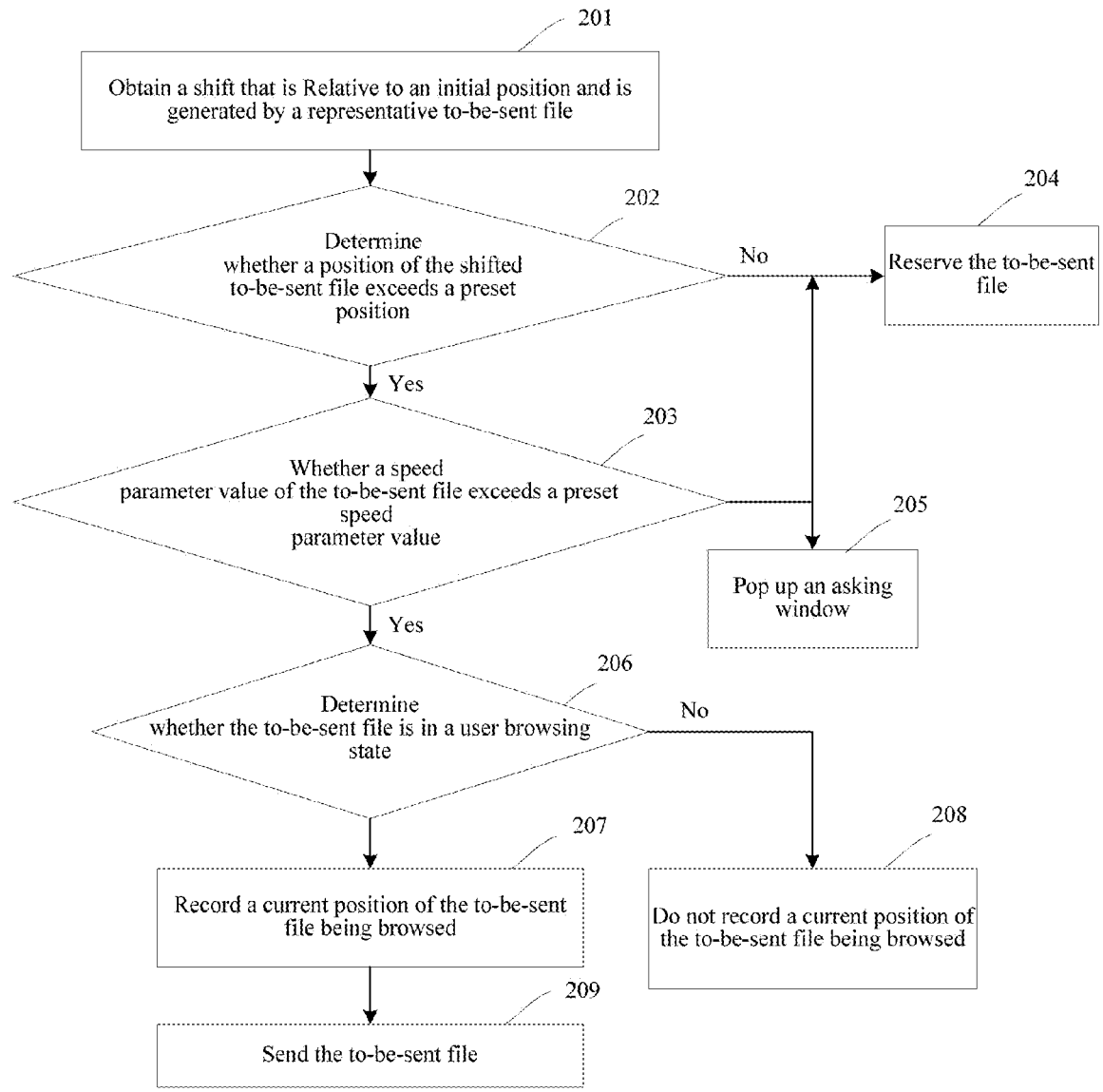
FIG. 2 is a specific flow chart of sending file data disclosed in an embodiment of the present invention.

A method for sending file data disclosed in an embodiment of the present invention is described by taking FIG. 2 as an example, and FIG. 2 is a specific flow chart of sending file data disclosed in an embodiment of the present invention.

As shown in FIG. 2, the user first selects a to-be-sent file and clicks a touch area formed by the to-be-sent file. According to the touch operation of the user, a shift, which is relative to an initial position and is generated when the user touches the touch area of the to-be-sent file on a mobile terminal, is obtained, and a specific determination of whether to send the file is made according to whether the position after the shift is generated exceeds a preset position. The mobile terminal records a coordinate of a user touch point, detects a changing direction of the user position, and according to the position changing direction and a position variation volume relative to the initial position, sends information of sending the to-be-sent file position variation volume and initial position. The specific steps are as follows:

Step 201: Obtain a shift that is relative to an initial position and is generated by a representative to-be-sent file.

Specifically, in the embodiment of the present invention, the user first selects, on the mobile terminal, the to-be-sent file that is shared with a receiving terminal, when the user touches a touch area of the to-be-sent file, the shift relative to the initial position of the to-be-sent file is generated along with the slide of the to-be-sent file, and the shift, which is relative to the initial position and is generated when the representative to-be-sent file shifts in a display area, is obtained.

The shift is a position variation volume and position changing direction that are relative to the initial position of the to-be-sent file and are generated by moving the to-be-sent file according to a touch input of the user; or a position vibration and position changing direction that are relative to the initial position of the to-be-sent file and is generated when the user moves the mobile terminal back and forth along opposite directions.

Step 202: Determine whether a position of the to-be-sent file after the shift exceeds a preset position.

Specifically, if the obtained shifted position exceeds the preset position, step 203 is performed, otherwise, step 204 is performed.

Step 203: Determine whether a speed parameter value of the to-be-sent file exceeds a preset speed parameter value.

Specifically, it is determined whether a speed parameter value of the user dragging the to-be-sent file exceeds the preset speed parameter value, if the speed parameter value of the to-be-sent file exceeds the preset speed parameter value, step 206 is performed; otherwise, step 205 or step 204 is performed.

Step 204: Reserve the to-be-sent file.

Step 205: Pop up an asking window.

Specifically, if the speed parameter value of the to-be-sent file does not exceed the preset speed parameter value, the asking window is popped up to ask whether to send the to-be-sent file, and the user selects whether to send the to-be-sent file.

Step 206: Determine whether the to-be-sent file is in a user browsing state.

Specifically, if the to-be-sent file is in the user browsing state, step 207 is performed, and if the to-be-sent file is not in the user browsing state, step 208 is performed.

Step 207: Record a current position of the to-be-sent file being browsed.

Specifically, according to the determination of the step 206, if the to-be-sent file is in the user browsing state, the current position of the to-be-sent file being browsed by the user is recorded, and division and packaging are performed on the to-be-sent file to divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part; and step 209 is performed.

Step 208: Do not record a current position of the to-be-sent file being browsed.

Step 209: Send the to-be-sent file.

Specifically, according to the description of step 207, the non-browsed part corresponding to the part after the point of division is sent from the non-browsed part of the to-be-sent file to the receiving mobile terminal; after the sending of the non-browsed part is completed, the user is prompted that the sending of the part of the to-be-sent file that is not browsed by the user is completed and the part of the to-be-sent file that has been browsed by the user is not sent, and a prompt window of whether to send the browsed part of the to-be-sent file is generated; and, according to the selection of the user, the transmission of the to-be-sent file is ended, or the browsed part of the to-be-sent file is sent and the transmission of the to-be-sent file is ended.

The embodiments all describe the working flows of sending the file data by using a sending terminal as a subject. The method for sending a file disclosed in an embodiment of the present invention is illustrated in detail by taking FIG. 3 as an example, and FIG. 3 is a specific flow chart of sending file data through translation of a file disclosed in an embodiment of the present invention.

Figure 3:
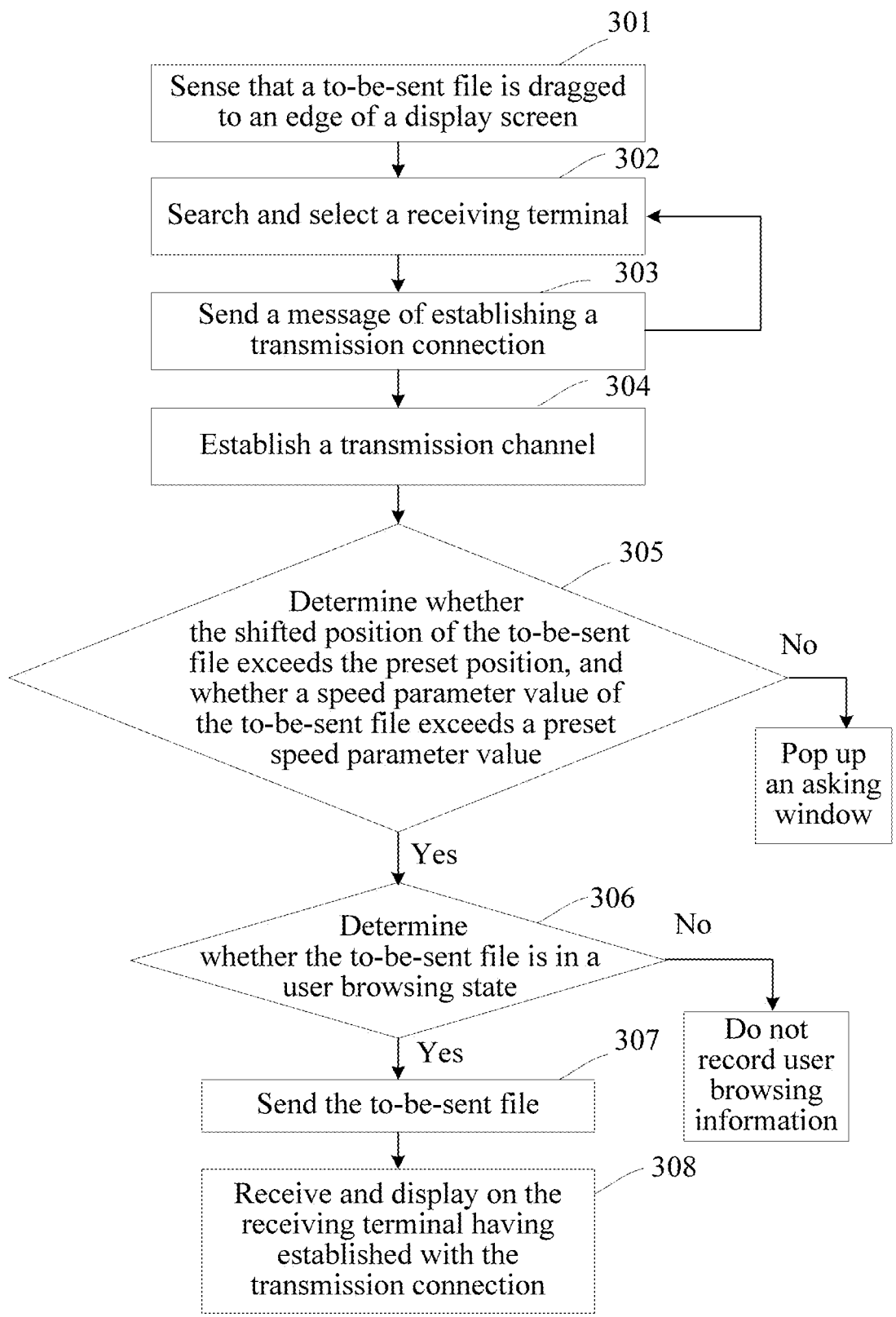
FIG. 3 is a specific flow chart of sending file data through translation of a file disclosed in an embodiment of the present invention.
Figure 4:
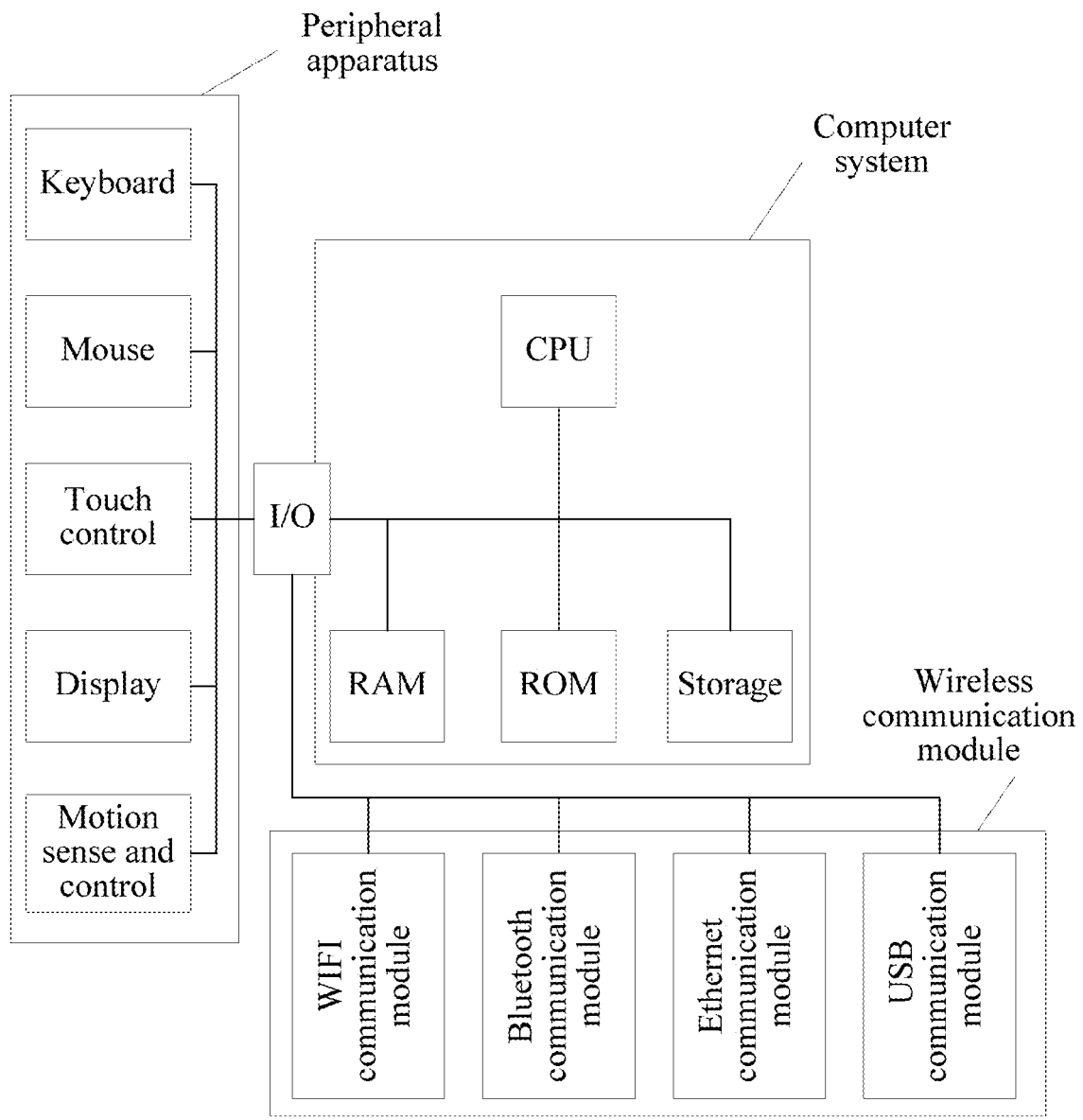
FIG. 4 is a schematic diagram of a hardware structure of a mobile terminal disclosed in an embodiment of the present invention.
Figure 5:
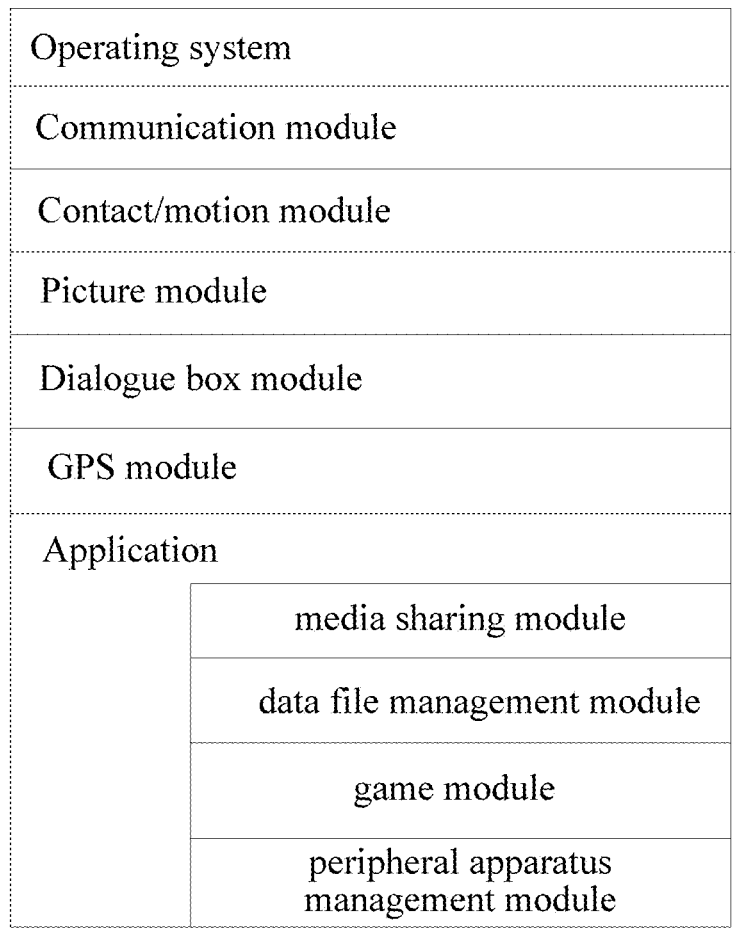
FIG. 5 is a schematic diagram of a software structure of a mobile terminal disclosed in an embodiment of the present invention.

As shown in FIG. 3, the user first selects a to-be-sent file and clicks a touch area formed by the to-be-sent file. According to the touch operation of the user, a shift, which is relative to an initial position and is generated when the user touches the touch area of the to-be-sent file on a mobile terminal, is obtained, and a specific determination of whether to send the file is made according to whether the position after the shift is generated exceeds a preset position. The mobile terminal first records a coordinate of a user touch point, then detects a changing direction of the user position, and according to the position changing direction and a position variation volume relative to the initial position, sends information of sending the to-be-sent file position variation volume initial position. The specific steps are as follows:

In the embodiment of the present invention, FIG. 4 is a schematic diagram of a hardware structure of a mobile terminal disclosed in an embodiment of the present invention, and FIG. 5 is a schematic diagram of a software structure of a mobile terminal disclosed in an embodiment of the present invention. An internal structural diagram of a mobile terminal apparatus A is shown in FIG. 4, and mainly includes: peripheral apparatus members, computer system members, and wireless communication members. The members are connected through input/output (I/O) interfaces and send control commands. The peripheral apparatus members mainly include: a keyboard unit, a mouse unit, a touch control unit, a display unit, and a motion sense and control unit. The computer system members mainly include: a central processing unit (CPU), a random-access memory (RAM), a read-only memory (ROM), and a storage unit. The wireless communication member mainly include: a Wi-Fi communication interface unit, a Bluetooth communication interface unit, an Ethernet communication interface unit, and a universal serial bus (USB) communication interface unit.

A software structural diagram of the mobile terminal apparatus A is shown in FIG. 5. Software modules for implementing mutual file sending between two mobile terminals in the embodiment of the present invention mainly depend on a media sharing module; and the mutual file sending between the mobile terminals is implemented through the media sharing module.

The implementation steps of the method are described through accompanying drawings. In order to improve the applicability and flexibility of the present invention, the method for file transmission provided in an embodiment of the present invention further includes:

Step 301: Sense a file operation action of moving a selected to-be-sent file to an edge of a display screen that displays the selected to-be-sent file.

Figure 6:
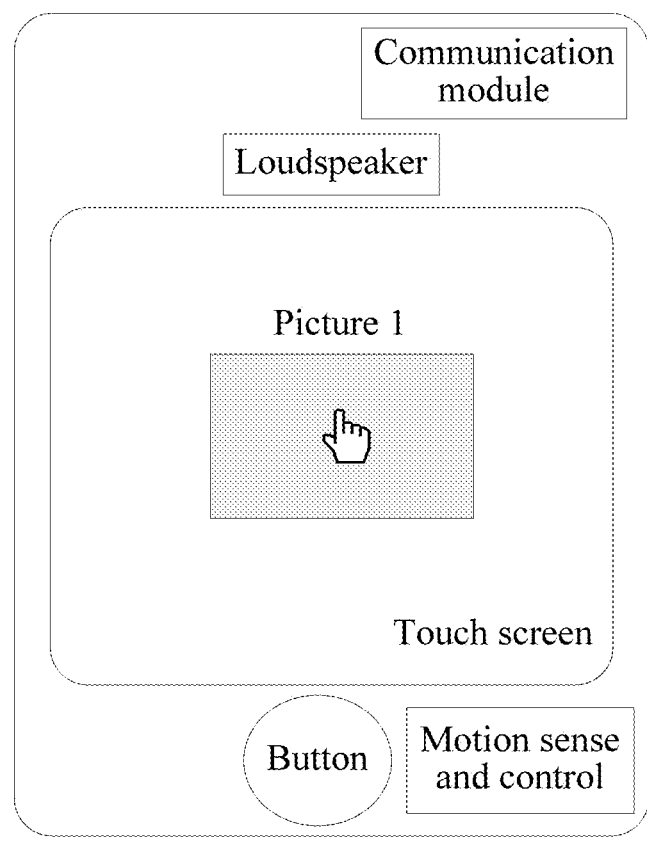
FIG. 6 is a diagram of selecting a to-be-sent file disclosed in an embodiment of the present invention.

Specifically, as shown in FIG. 6, FIG. 6 is a diagram of selecting a to-be-sent file disclosed in an embodiment of the present invention. The mobile terminal in the embodiment of the present invention is an apparatus A. The user requests the CPU through the touch control unit and the I/O interface to select, from the storage unit, the to-be-sent file that is ready for being shared with the receiving terminal. The CPU notifies the storage unit, selects the to-be-sent file from the storage unit, and sends the to-be-sent file to the display unit through the I/O interface. The display unit displays the to-be-sent file on a touch screen. In the drawing shown in FIG. 6, the user touches a touch area formed by the to-be-sent file, and after a finger of the user touches the touch area, a mouse hand in the touch area indicates that the user has touched the touch area of the to-be-sent file. The mobile terminal, through the touch operation of the user, obtains a touch input of the user, and may sense, according to the user's tracking detection on a moving track of the to-be-sent file selected through the touch input, whether the to-be-sent file is dragged to the edge of the display screen under the operation of the user. When the to-be-sent file is dragged to the edge of the display screen, it is considered that the user intends to perform transmission of the to-be-sent file with another receiving terminal. If the mobile terminal apparatus A does not establish a transmission connection with the receiving terminal to which the user intends to transmit the to-be-transmitted file, the foregoing file dragging action cannot implement the transmission of the file with an unknown receiving terminal. At this time, the mobile terminal apparatus A considers that the action of dragging the selected to-be-sent file to the edge of the display screen of the mobile terminal apparatus A indicates that it intends to establish a transmission connection with a peripheral receiving terminal. In this manner, it may be determined whether a subsequent action is directly transmitting the to-be-sent file or establishing a transmission connection with an unknown peripheral receiving terminal.

Figure 7:
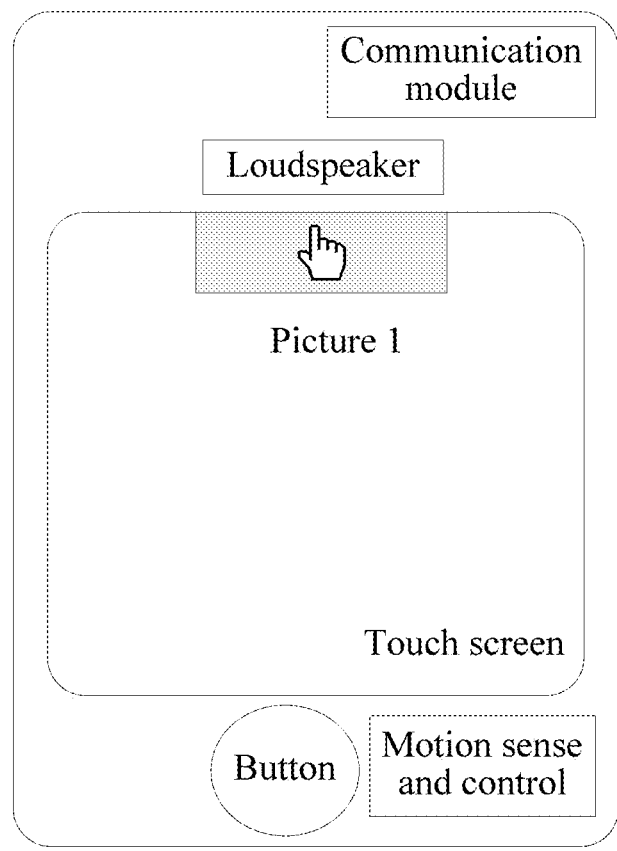
FIG. 7 shows a user touching a to-be-sent file to translation shift the file upwards disclosed in an embodiment of the present invention.
Figure 8:
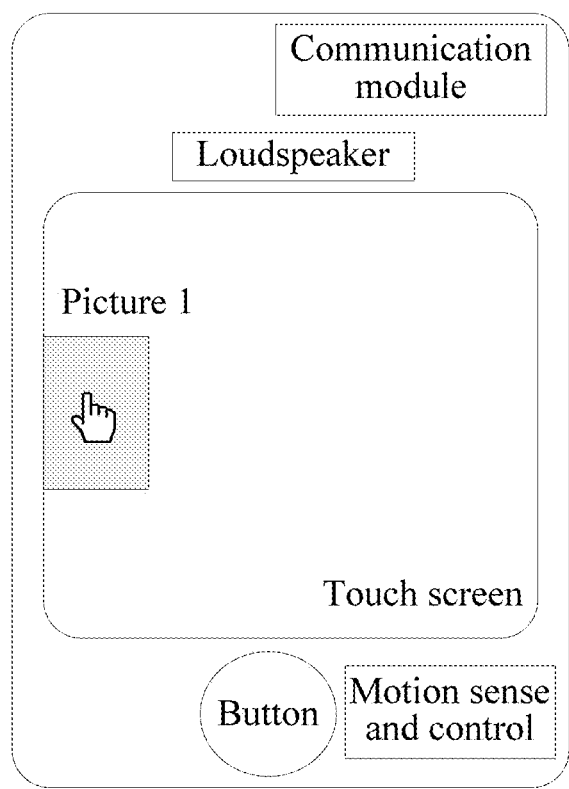
FIG. 8 shows a user touching a to-be-sent file to translation shift the file leftwards disclosed in an embodiment of the present invention.

Specifically, FIG. 7 is a diagram of a user touching a to-be-sent file to shift the file upwards disclosed in an embodiment of the present invention; and FIG. 8 is a diagram of a user touching a to-be-sent file to shift the file leftwards disclosed in an embodiment of the present invention. In the touch area formed by the user touching the to-be-sent file, an icon representing a to-be-transmitted file 1 is dragged to move, and as shown in FIG. 7 and FIG. 8, FIG. 7 shows a state that the user drags the icon representing the to-be-transmitted file 1 to an upper edge of the screen of the apparatus A, and FIG. 8 shows a state that the user drags the icon representing the to-be-transmitted file 1 to a left edge of the screen of the apparatus A. When the user drags a picture to the edge of the mobile terminal, the media sharing module recognizes that the edge touch operation of the user intends to send the to-be-sent file to a peripheral terminal apparatus, so the media sharing module searches for the peripheral terminal apparatus automatically according to original configuration or original component history of the user, and sets itself to enter a sharing state.

In order to improve the usability of the method of the present invention, here, an optional step 302 may be added, in which a receiving terminal is searched for and selected according to the sensed file operation action of moving the selected to-be-sent file to the edge of the display screen that displays the selected to-be-sent file.

Figure 9:
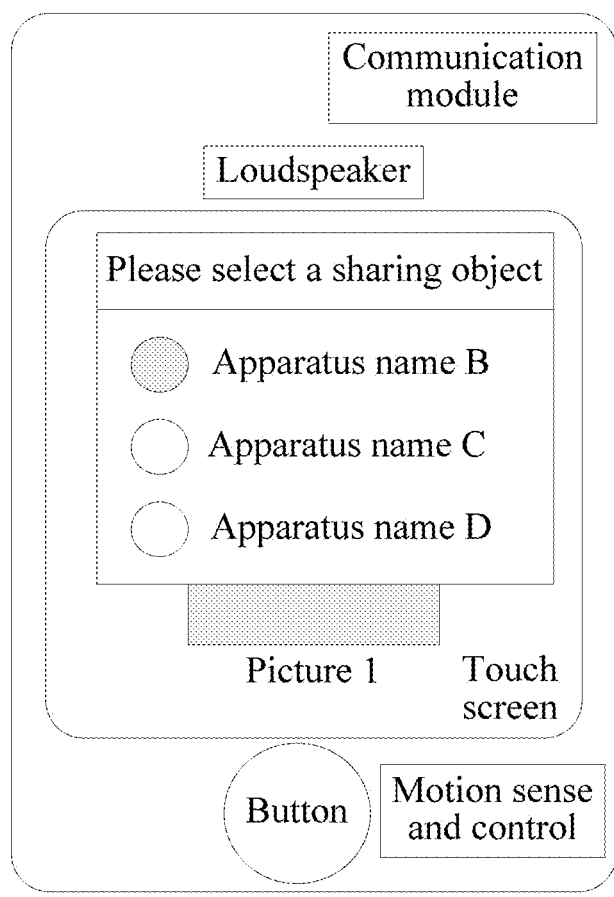
FIG. 9 is a diagram of a mobile terminal searching for a peripheral apparatus disclosed in an embodiment of the present invention.

Specifically, FIG. 9 is a diagram of a mobile terminal searching for a peripheral apparatus disclosed in an embodiment of the present invention. As shown in FIG. 9, multiple receiving terminals may exist around the apparatus A, and the user does not have any historical record of file sending and analysis about whether the apparatus A is safe, or the receiving terminals may all be the object of file sending. At this time, the media sharing module searches for the receiving terminals, and provides a detailed list of the receiving terminals. In the list of receiving terminals shown in FIG. 9, three receiving terminal names are listed, and according to a situation of the communication negotiation with the receiving terminals, the media sharing module provides the names of the receiving terminals, being apparatus B, apparatus C and apparatus D respectively. The user selects a receiving terminal randomly from them to serve as the object of file sending. In the embodiment of the present invention, the apparatus B is selected as the object of file sending. The step is mainly aimed at enabling the user to select the receiving terminal flexibly, and implement interaction with a certain selected receiving terminal among multiple receiving terminals under different scenarios, thereby improving the applicability of the solution of the present disclosure.

Optionally, step 303: send, to the selected receiving terminal, a message requesting establishment of a transmission connection.

Figure 10:
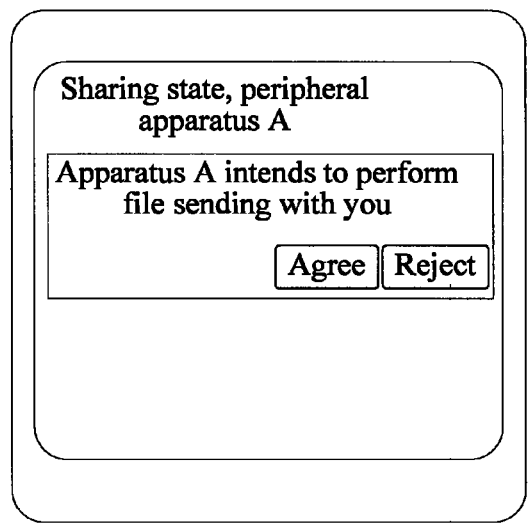
FIG. 10 is a dialogue box of a selected mobile terminal disclosed in an embodiment of the present invention.

Specifically, FIG. 10 is a dialogue box of a selected mobile terminal disclosed in an embodiment of the present invention. As shown in FIG. 10, according to the selection of step 302, the user selects the apparatus B as the object of file sending, sends, to the apparatus B, a message requesting the sending establishment of a transmission connection, and an information selection dialogue box appears in the apparatus B to ask whether the apparatus B agrees to establish a file transmission connection with the apparatus A. If the apparatus B agrees to establish the file transmission connection with the apparatus A, an agree button is selected to send feedback information indicating agreement of the establishment of the file transmission connection with the apparatus A, and step 305 is performed. If the apparatus B does not agree to establish the file transmission connection with the apparatus A, a reject button is selected to send feedback information indicating rejection of the establishment of the file transmission connection with the apparatus A, and the file transmission flow is ended or the step 302 is performed again to reselect a receiving terminal. The step is mainly aimed at establishing an interaction channel between the apparatus A and the selected receiving terminal, thereby implementing interaction between the apparatus A and the selected receiving terminal under different scenarios.

Step 304: According to the feedback of the selected receiving terminal to the message of establishing the transmission connection, establish a transmission connection with the receiving terminal, or reselect a receiving terminal until a transmission connection is established with the selected receiving terminal.

Through steps 301-303, the apparatus A selects a receiving terminal flexibly, establishes an interaction channel with the selected receiving terminal, and starts the sending of the to-be-sent file with the selected receiving terminal through the established interaction channel.

Step 305 to step 308 show a specific process of sending the to-be-sent file between the apparatus A and the selected receiving terminal that has established with a transmission connection.

Step 305: Determine whether the shifted position of the to-be-sent file exceeds the preset position, and whether a speed parameter value of the to-be-sent file exceeds a preset speed parameter value.

Figure 11:
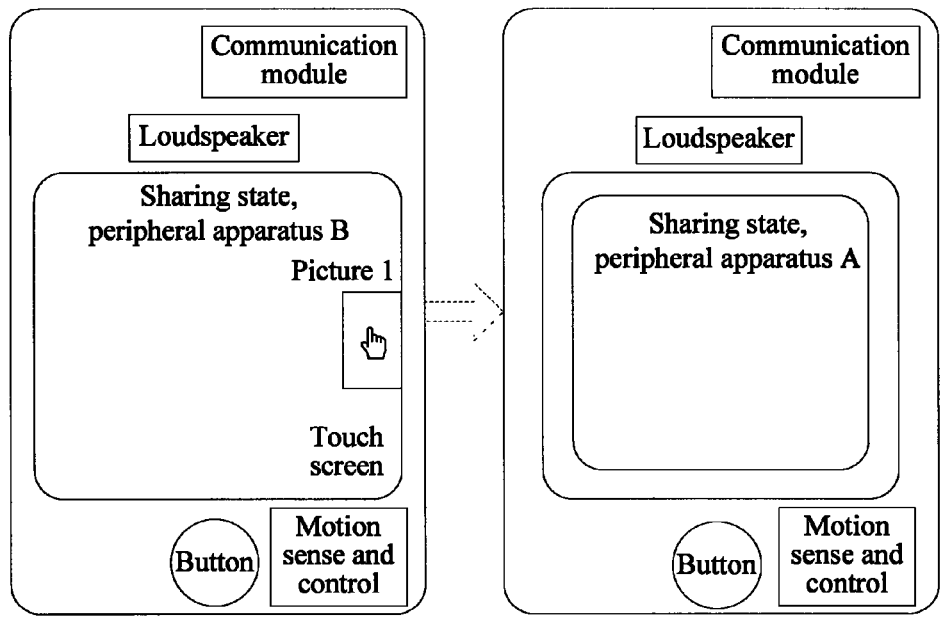
FIG. 11 is a diagram of a mobile terminal being ready for sending a to-be-sent file disclosed in an embodiment of the present invention.

Specifically, FIG. 11 is a diagram of a mobile terminal ready for sending a to-be-sent file disclosed in an embodiment of the present invention. As shown in FIG. 11, according to the determination of the step 303, the receiving terminal apparatus B agrees to receive the to-be-sent file 1 sent by the apparatus A, the apparatus A and the apparatus B enter the sharing state at the same time, and display the name of the receiving terminal. The apparatus A obtains a position variation volume and position changing direction of the to-be-sent file, where the position variation volume and position changing direction are relative to an initial position of the to-be-sent file, so as to determine the shift of the to-be-sent file.

That is: the user touches the touch area of the to-be-sent file, and moves the to-be-sent file, so as to generate the position variation volume relative to the initial position. A preset position is set in the apparatus A, which is used to determine whether the position variation volume and position changing direction after the to-be-sent file is shifted contact an edge of a display screen of the apparatus A. When the user shifts the to-be-sent file to the edge of the apparatus A and the user continues moving the to-be-sent file, that is, when the position variation volume and position changing direction relative to the initial position reaches or exceeds the preset position, the apparatus A obtains the position variation volume and position changing direction relative to the initial position to determine the shift of the to-be-sent file. If the position variation volume and position changing direction relative to the initial position of the touch area of the to-be-sent file does not reach or exceed the preset position, the apparatus A does not obtain the position variation volume and position changing direction relative to the initial position to determine the shift of the to-be-sent file.

Moreover, in order to avoid mis-operation, it may be further determined whether a speed parameter value of the to-be-sent file exceeds a preset speed parameter value, that is, the apparatus A determines whether a speed parameter value of the user dragging the to-be-sent file exceeds the preset speed parameter value, and if the speed parameter value of the to-be-sent file exceeds the preset speed parameter value, sends the to-be-sent file; otherwise, pops up an asking window to ask whether to send the to-be-sent file, or does not send the to-be-sent file. The speed of dragging the file when the user intends to send the file is faster than the speed when the user does not intend to send the file, and therefore, it may be determined, according to the speed of the user dragging the to-be-sent file, whether the user intends to send the to-be-sent file. At the same time, in order to compensate misjudgment on whether the user intends to send the to-be-sent file, where the misjudgment is caused by using habits of different users and changes of a sliding speed when moving the file, when it is determined that the speed of the user dragging the to-be-sent file does not exceed the preset speed parameter value, a dialogue box is popped up for the user to select whether to send the to-be-sent file.

Step 306: Determine whether the to-be-sent file is in a user browsing state.

Specifically, if the to-be-sent file is in the user browsing state, a current position of the to-be-sent file being browsed by the user is recorded, and division and packaging is performed on the to-be-sent file to divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part. If the to-be-sent file is not in the user browsing state, the current position of the to-be-sent file being browsed by the user is not recorded.

Step 307: Send the to-be-sent file.

Specifically, according to the determination of the step 306, when the user moves the to-be-sent file again, a media sharing software module in the apparatus A automatically transmits the non-browsed part of the to-be-sent file to the apparatus B configured with the same media sharing software module.

Step 308: Receive and display on the receiving terminal having established with the transmission connection.

Figure 12:
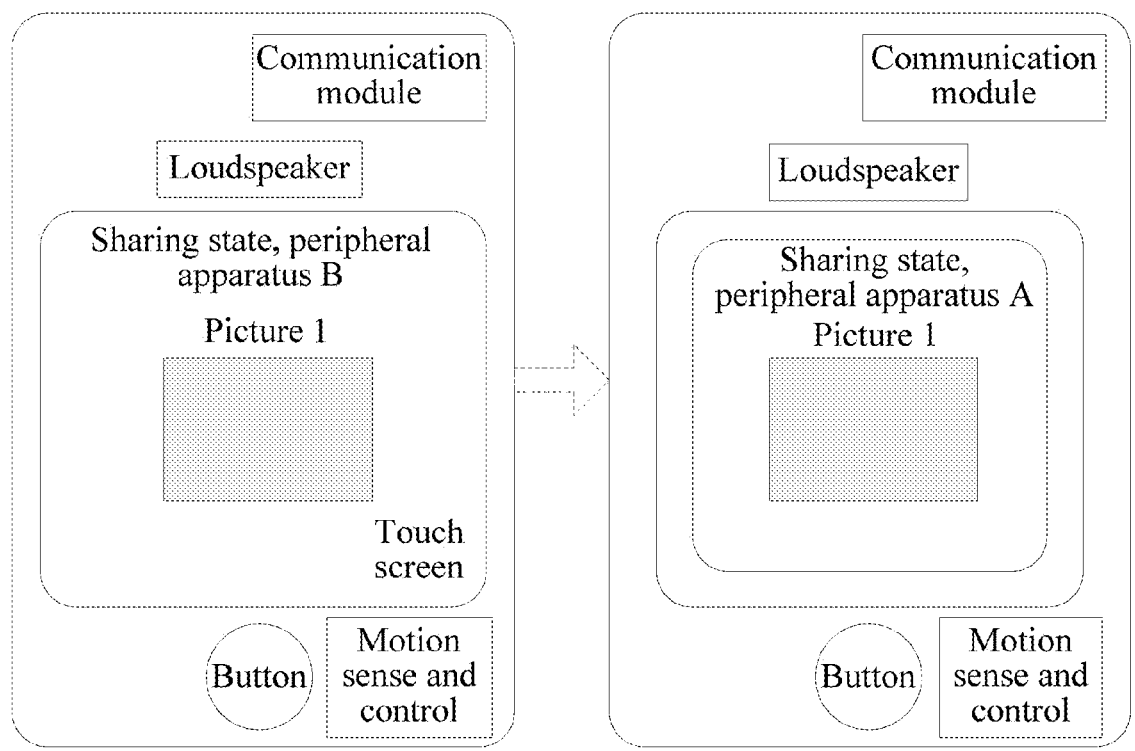
FIG. 12 is a diagram of ending the sending of a to-be-sent file disclosed in an embodiment of the present invention.

Specifically, FIG. 12 is a diagram of ending the sending of a to-be-sent file disclosed in an embodiment of the present invention. As shown in FIG. 12, when the user stops touching the to-be-sent file in the apparatus A and a finger of the user leaves a touch interface, the to-be-sent file returns to the initial position, and at the same time, the apparatus B displays a display interface.

Figure 13:
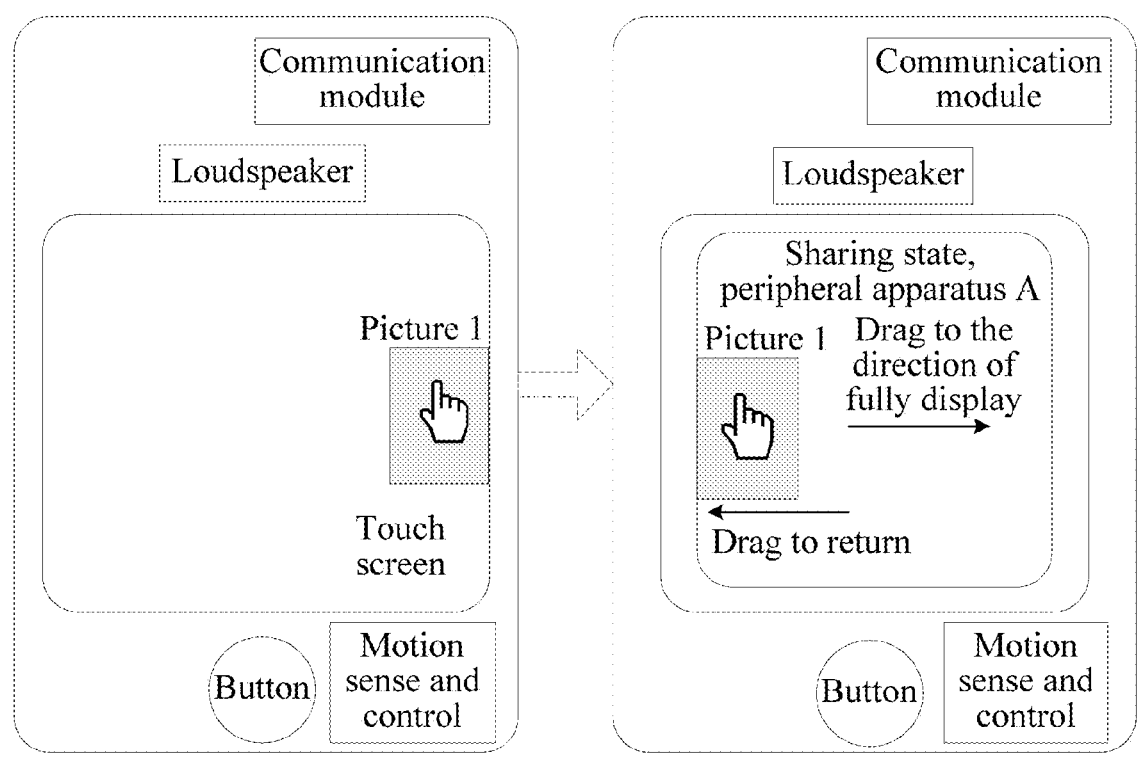
FIG. 13 is a diagram of a process of slowly sending a to-be-sent file disclosed in an embodiment of the present invention.

In the embodiment of the present invention, FIG. 13 is a diagram of a process of sending a to-be-sent file slowly disclosed in an embodiment of the present invention. As shown in FIG. 13, the situation that the user moves the to-be-sent file slowly is shown. When the user moves the to-be-sent file slowly to the edge of the apparatus A and continues moving the to-be-sent file to exceed the boundary of the apparatus A, the display screen of the apparatus B may also display the receiving to-be-sent file slowly. At the same time, the user may move the to-be-sent file by using a mouse, so as to quickly view a picture, that is, moving to the direction of displaying fully or moving to the direction of returning the picture when the to-be-sent file is rejected to be received as shown in FIG. 13.

After the sending of the non-browsed part is completed, the user is prompted that the sending of the non-browsed part of the to-be-sent file is completed and the browsed part of the divided to-be-sent file is not sent, and a prompt window of whether to send the browsed part of the to-be-sent file is generated; and according to a selection of the user, the transmission of the to-be-sent file is ended, or the browsed part of the to-be-sent file is sent and the transmission of the to-be-sent file is ended.

In the embodiments described in the foregoing, the sending of the file data is triggered through triggering the to-be-sent file by the user, and in embodiments described below, the sending of the file data is triggered through shaking the mobile terminal by the user. A method of sending a file disclosed in another embodiment of the present invention is illustrated in detail by taking FIG. 14 as an example, and FIG. 14 is a specific flow chart of sending file data through shaking a mobile terminal disclosed in an embodiment of the present invention.

Figure 14:
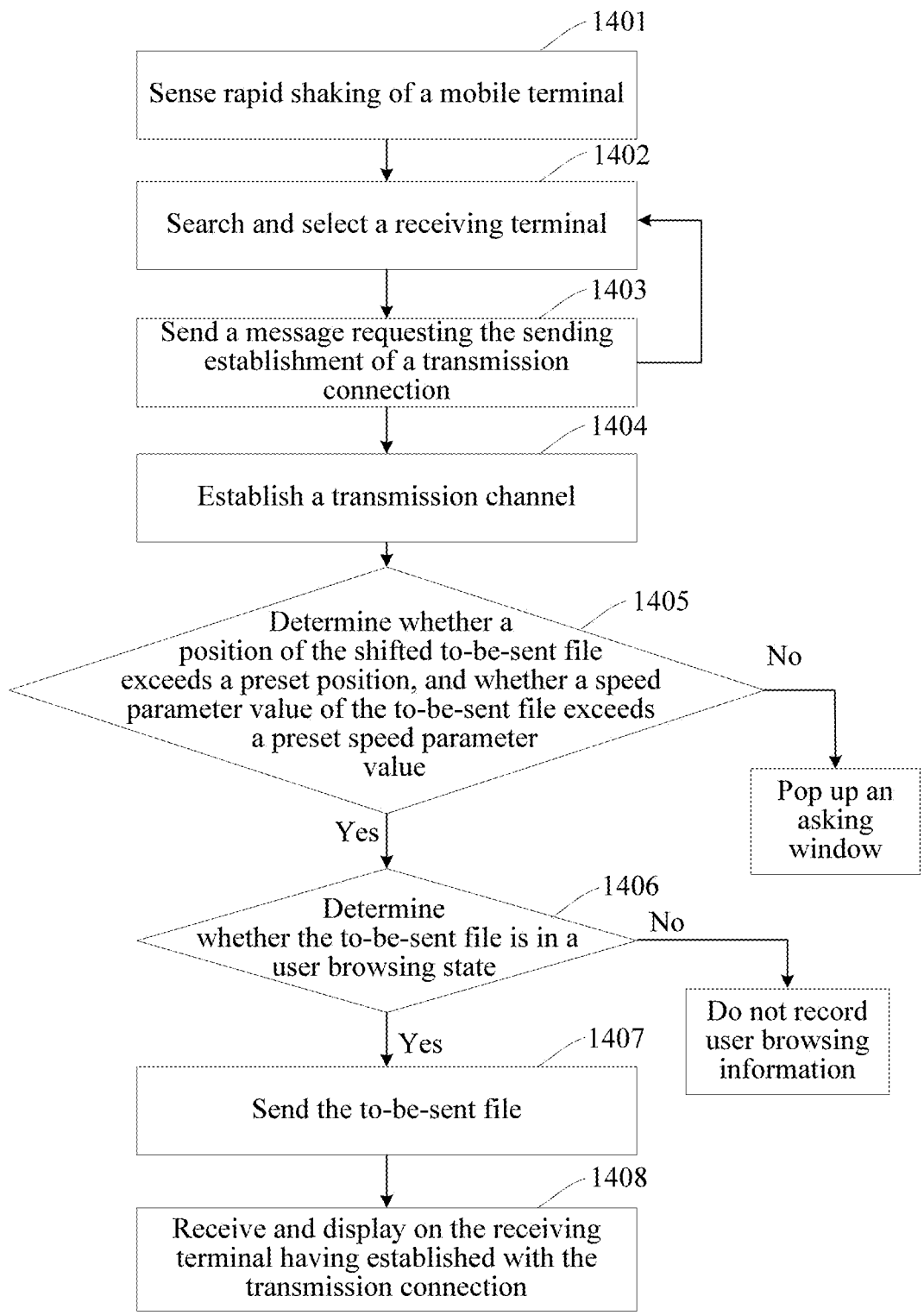
FIG. 14 is a specific flow chart of sending file data through shaking a mobile terminal disclosed in an embodiment of the present invention.

As shown in FIG. 14, first, the user selects a to-be-sent file, when the mobile terminal shakes, the selected to-be-sent file is shaken. At this time, a shift, which is relative to an initial position and is generated when the representative to-be-sent file shifts in a display area, is obtained, and a specific determination of whether to send the file is made according to whether the generated shift exceeds a preset position. The mobile terminal records a coordinate of a user touch point, enables the to-be-sent file to rotate according to the shaking of the mobile terminal, and sends information of sending the to-be-sent file according to the position of the rotation direction. The specific steps are as follows:

In the embodiment of the present invention, the hardware for implementing the sending of the file data is the same as the hardware structural diagrams provided in FIG. 4 and FIG. 5, which is not repeated here.

The implementation steps of the method are described through accompanying drawings. In order to improve the applicability and flexibility of the present invention, the method for file transmission provided in an embodiment of the present invention further includes:

Step 1401: Sense the shaking of the mobile terminal, and enable the selected to-be-sent file to rotate leftwards and rightwards in the display screen.

Figure 15:
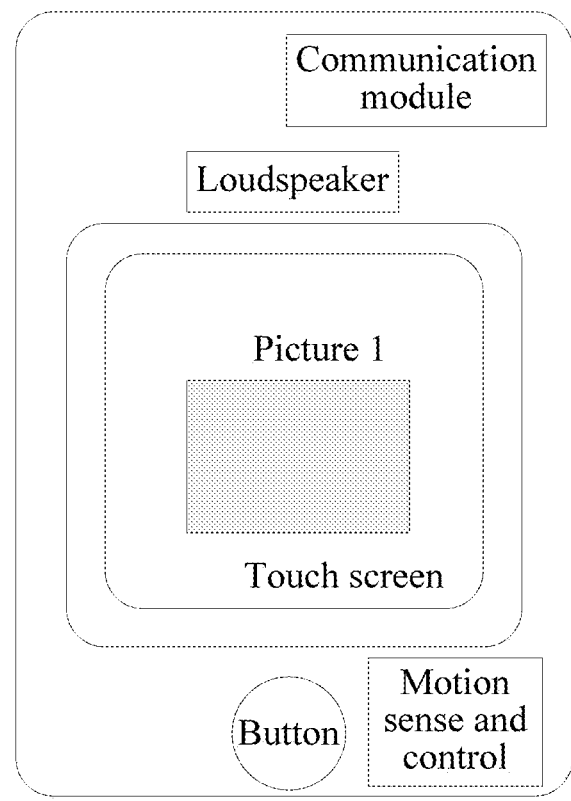
FIG. 15 is a diagram of selecting a to-be-sent file disclosed in an embodiment of the present invention.

Specifically, as shown in FIG. 15, FIG. 15 is a diagram of selecting a to-be-sent file disclosed in an embodiment of the present invention. The mobile terminal in the embodiment of the present invention is an apparatus A. The user requests the CPU through the touch control unit and the I/O interface to select, from the storage unit, the to-be-sent file that is ready for being shared with the receiving terminal. The CPU notifies the storage unit, selects the to-be-sent file from the storage unit, and sends the to-be-sent file to the display unit through the I/O interface. The display unit displays the to-be-sent file on a touch screen. In the drawing shown in FIG. 15, the user touches a touch area formed by the to-be-sent file, and after a finger of the user touches the touch area, a mouse hand in the touch area indicates that the user has touched the touch area of the to-be-sent file. The mobile terminal, through the touch operation of the user, obtains a touch input of the user, and may sense, according to shaking of the user to the mobile terminal apparatus A leftwards and rightwards that enables the to-be-sent file to move leftwards and rightwards similarly in the display area, whether the to-be-sent file contacts the edge of the display screen under the operation of the user. When the to-be-sent file contacts the edge of the display screen, it is considered that the user intends to perform transmission of the to-be-sent file with another receiving terminal.

If the mobile terminal apparatus A does not establish a transmission connection with the receiving terminal to which the user intends to transmit the to-be-transmitted file, the foregoing shaking action cannot implement the transmission of the file with an unknown receiving terminal. At this time, the mobile terminal apparatus A considers that the action of shaking the selected to-be-sent file indicates that it intends to establish a transmission connection with a peripheral receiving terminal. In this manner, it may be determined whether the subsequent action is directly transmitting the to-be-sent file or establishing the transmission connection with the unknown peripheral receiving terminal.

Figure 16:
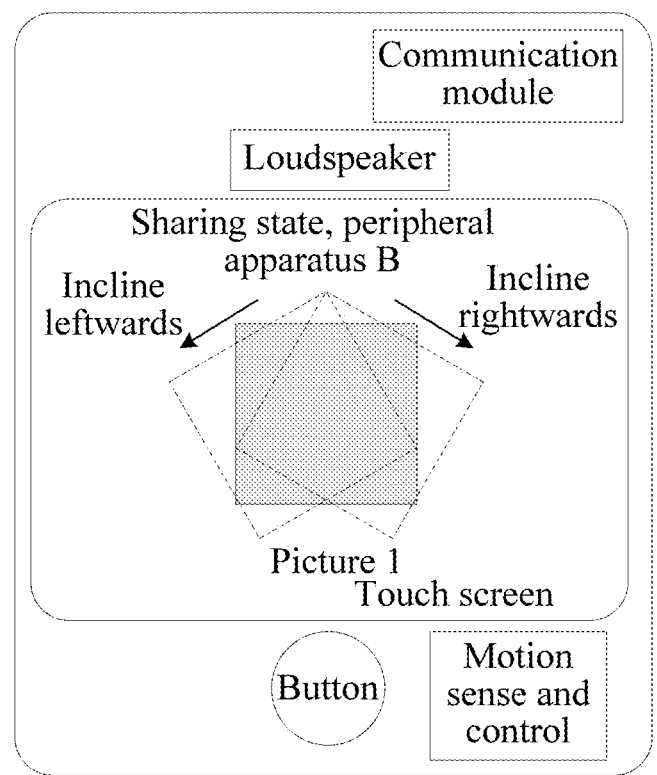
FIG. 16 is a diagram of shaking a mobile terminal to rotate a to-be-sent file leftwards and rightwards disclosed in an embodiment of the present invention.

Specifically, FIG. 16 is a diagram of shaking a mobile terminal to rotate a to-be-sent file leftwards and rightwards disclosed in an embodiment of the present invention. As shown in FIG. 16, a state that an icon representing a to-be-transmitted file 1 rotates leftwards and rightwards quickly, which is caused by the shaking of the apparatus A, is shown in FIG. 16, and is indicated by dotted boxes. The to-be-sent file is selected according to the touch input of the user and the apparatus A is moved back and forth in opposite directions. When the apparatus A is shaken leftwards, the icon representing the to-be-transmitted file 1 rotates leftwards on the apparatus A, and when the apparatus A is shaken rightwards, the icon representing the to-be-transmitted file 1 rotates rightwards on the apparatus A. When the icon representing the to-be-transmitted file 1 rotates leftwards and rightwards quickly, the media sharing module recognizes that the shaking operation of the mobile terminal intends to send the to-be-sent file to the receiving terminal. However, due to the interface limit of the mobile terminal, the to-be-sent file cannot be sent, so the media sharing module searches for the peripheral terminal apparatus automatically according to original configuration or original component history of the user, and sets itself to enter a sharing state.

In order to improve the usability of the method of the present invention, here, an optional step 1402 may be added, in which a receiving terminal is searched for and selected according to the rotating action of the selected to-be-sent file due to the sensed shaking of the mobile terminal.

Figure 17:
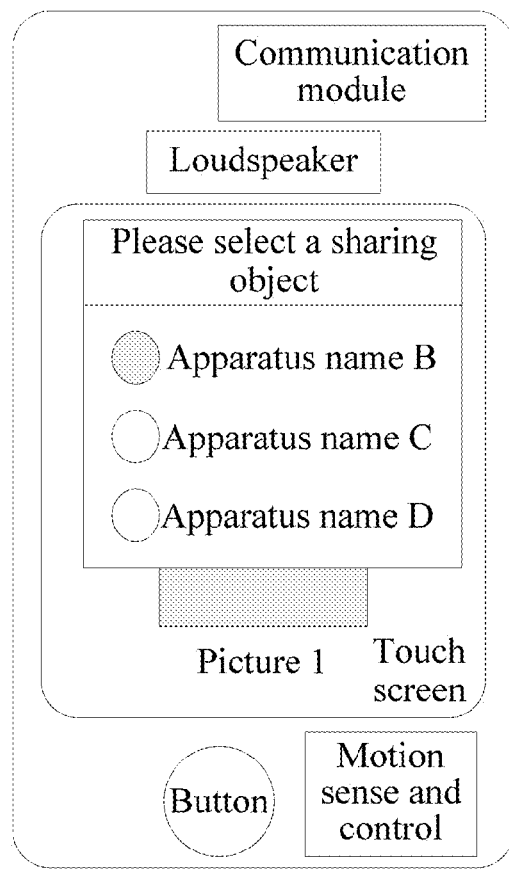
FIG. 17 is a diagram of a mobile terminal searching for a peripheral apparatus disclosed in an embodiment of the present invention.

Specifically, FIG. 17 is a diagram of a mobile terminal searching for a peripheral apparatus disclosed in an embodiment of the present invention. As shown in FIG. 17, multiple receiving terminals may exist around the apparatus A, and the user does not have any historical record of file sending and analysis about whether the apparatus A is safe, or the receiving terminals may all be the object of file sending. At this time, the media sharing module searches for the receiving terminals, and gives a detailed list of the receiving terminals. In the list of receiving terminal shown in FIG. 17, three receiving terminal names are listed, the media sharing module, according to a situation of the communication negotiation with the receiving terminals, provides names of the receiving terminals, being apparatus B, apparatus C and apparatus D respectively. The user selects a receiving terminal randomly from them to serve as the object of file sending. In the embodiment of the present invention, the apparatus B is selected as the object of file sending. The step is mainly aimed at enabling the user to select the receiving terminal flexibly, and implement interaction with a certain selected receiving terminal among multiple receiving terminals under different scenarios, thereby improving the applicability of the solution of the present disclosure.

Optionally, step 1403: send, to the selected receiving terminal, a message requesting the sending establishment of a transmission connection.

Figure 18:
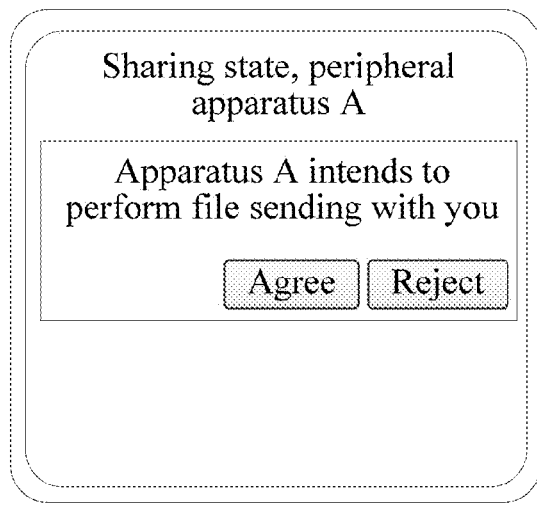
FIG. 18 is a dialogue box of a selected mobile terminal disclosed in an embodiment of the present invention.

Specifically, FIG. 18 is a dialogue box of a selected mobile terminal disclosed in an embodiment of the present invention. As shown in FIG. 18, according to the selection of step 1402, the user selects the apparatus B as the object of file sending, sends a message requesting the sending establishment of a transmission connection to the apparatus B, and an information selection dialogue box appears in the apparatus B to ask whether the apparatus B agrees to establish a file transmission connection with the apparatus A. If the apparatus B agrees to establish the file transmission connection with the apparatus A, an agree button is selected to send feedback information indicating agreement of the establishment of the file transmission connection with the apparatus A, and step 1406 is performed. If the apparatus B does not agree to establish the file transmission connection with the apparatus A, a reject button is selected to send feedback information indicating rejection of the establishment of the file transmission connection with the apparatus A, and the file transmission flow is ended or the step 1402 is performed again to reselect a receiving terminal. The step is mainly aimed at establishing an interaction channel between the apparatus A and the selected receiving terminal, thereby implementing interaction between the apparatus A and the selected receiving terminal under different scenarios.

Step 1404: According to the feedback of the selected receiving terminal to the message of establishing the transmission connection, establish a transmission connection with the receiving terminal, or reselect a receiving terminal until a transmission connection is established with the selected receiving terminal.

Through steps 1401-1403, the apparatus A selects a receiving terminal flexibly, establishes an interaction channel with the selected receiving terminal, and starts to send the to-be-sent file with the selected receiving terminal through the established interaction channel.

Step 1405 to step 1408 show a specific process of sending the to-be-sent file by the apparatus A with the selected receiving terminal that has established with a transmission connection.

Step 1405: Determine whether the shifted position of the to-be-sent file exceeds the preset position, and whether a speed parameter value of the to-be-sent file exceeds a preset speed parameter value.

Specifically, according to the determination of the step 1403, the receiving terminal apparatus B agrees to receive the to-be-sent file 1 sent by the apparatus A, the apparatus A and the apparatus B enter the sharing state at the same time, and display the name of the receiving terminal. A position variation volume and position changing direction of the to-be-sent file, where the position variation volume and position changing direction are relative to an initial position of the to-be-sent file in the display area when the apparatus A moves back and forth in opposite directions are obtained, so as to determine the shift of the to-be-sent file.

That is the user shakes the apparatus A leftwards and rightwards quickly, so that the icon representing the to-be-transmitted file 1 in the apparatus A also generates the shift variation relative to the initial position at the same time. A preset position is set in the apparatus A, that is, whether the position variation volume and position changing direction of the to-be-sent file after shifting exceed the preset position. If the position variation volume and position changing direction of the to-be-sent file after rotating leftwards and rightwards exceed the preset position, the position variation volume and position changing direction relative to the initial position when the apparatus A moves back and forth in opposite directions are obtained, so as to determine the shift of the to-besent file. If the position variation volume and position changing direction of the to-be-sent file after rotating leftwards and rightwards do not exceed the preset position, the position variation volume and position changing direction relative to the initial position when the apparatus A moves back and forth in opposite directions are not obtained to determine the shift of the to-be-sent file.

At the same time, the apparatus A determines whether a speed parameter value of the to-be-sent file exceeds a preset speed parameter value, and if the speed parameter value of the to-be-sent file exceeds the preset speed parameter value, sends the to-be-sent file; otherwise, pops up an asking window to ask whether to send the to-be-sent file, or does not send the to-be-sent file.

Step 1406: Determine whether the to-be-sent file is in a user browsing state.

Specifically, if the to-be-sent file is in the user browsing state, a current position of the to-be-sent file being browsed by the user is recorded, and division and packaging is performed on the to-be-sent file to divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part. If the to-be-sent file is not in the user browsing state, the current position of the to-be-sent file being browsed by the user is not recorded.

Step 1407: Send the to-be-sent file.

Specifically, when the apparatus A shakes, the media sharing software module in the apparatus A automatically transmits the non-browsed part of the to-be-sent file to the apparatus B configured with the same media sharing software module.

Step 1408: Receive and display on the receiving terminal having established with the transmission connection.

Figure 19:
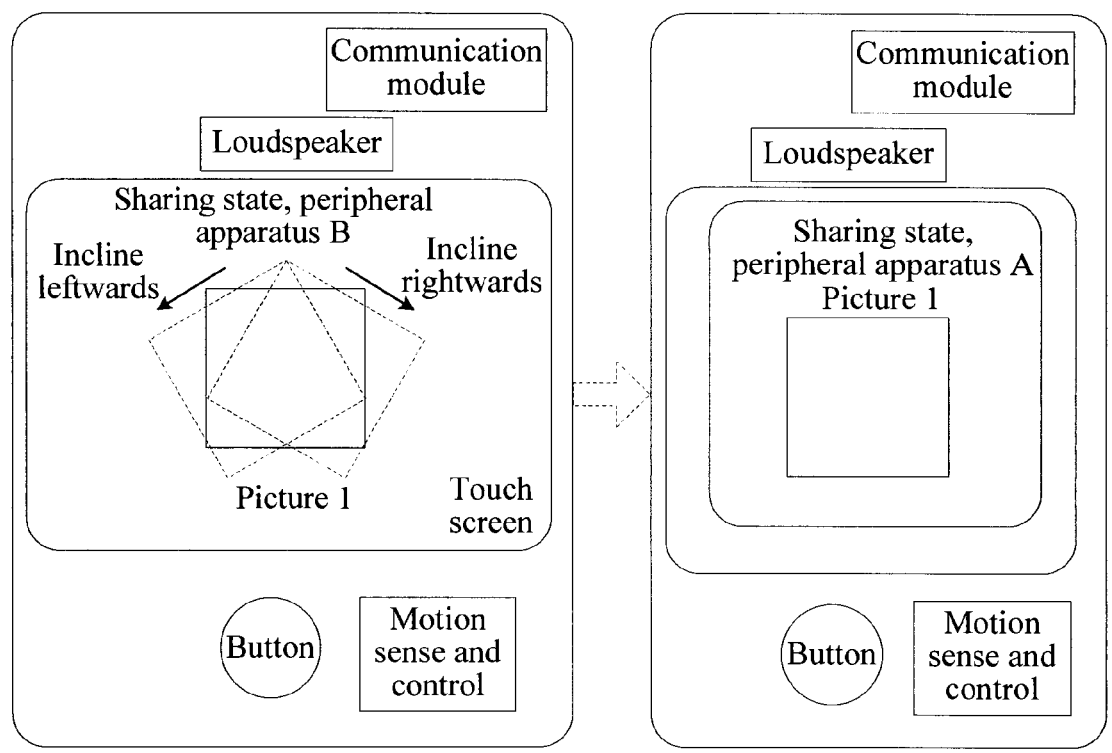
FIG. 19 is a diagram of ending the sending of a to-be-sent file disclosed in an embodiment of the present invention.

Specifically, FIG. 19 is a diagram of ending the sending of a to-be-sent file disclosed in an embodiment of the present invention. As shown in FIG. 19, when the user stops touching the to-be-sent file in the apparatus A and a finger of the user leaves a touch interface, the to-be-sent file returns to the initial position, and at the same time, the apparatus B displays a display interface.

After the sending of the non-browsed part is completed, the user is prompted that the sending of the non-browsed part of the to-be-sent file is completed and the browsed part of the divided to-be-sent file is not sent, and a prompt window of whether to send the browsed part of the to-be-sent file is generated; and according to a selection of the user, the transmission of the to-be-sent file is ended, or the browsed part of the to-be-sent file is sent and the transmission of the to-be-sent file is ended.

Figure 20:
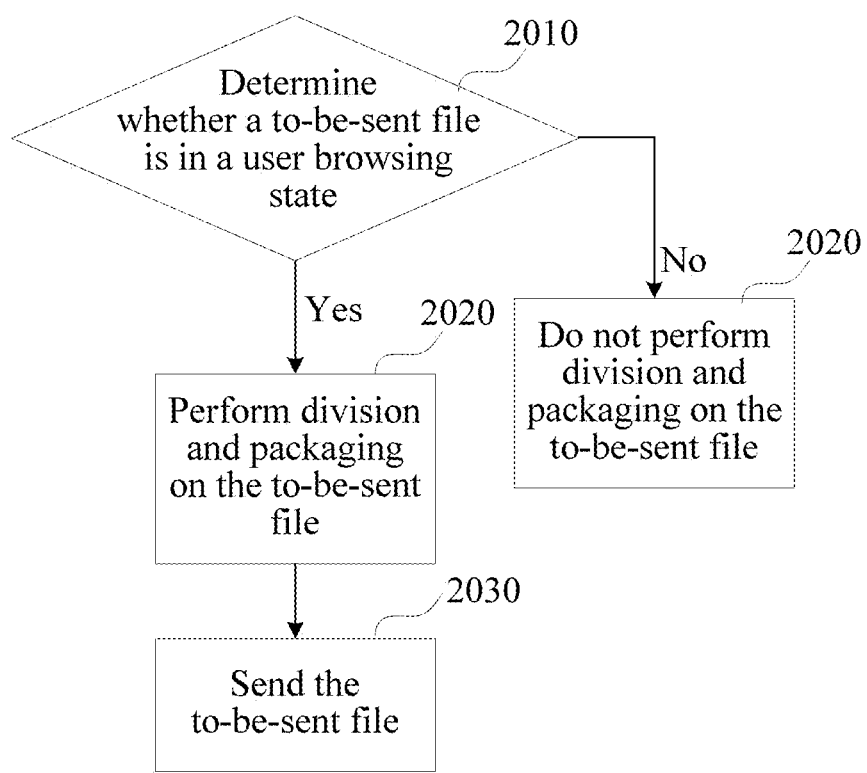
FIG. 20 is a flow chart of another method for sending file data disclosed in an embodiment of the present invention.

Another method for sending a file disclosed in an embodiment of the present invention is described in detail by taking FIG. 20 as an example, and FIG. 20 is a flow chart of another method for sending a file disclosed in an embodiment of the present invention.

As shown in FIG. 20, first it is determined whether a to-be-sent file is in a user browsing state, and specific determination of whether to send the file is made according to a selection of the user. The specific steps are as follows:

Step 2010: Determine whether the to-be-sent file is in a user browsing state.

Specifically, the user first selects, on the mobile terminal, a to-be-sent file that is to be shared with a receiving terminal. When the user touches a touch area of the to-be-sent file, the mobile terminal determines whether the to-be-sent file is in the user browsing state. If the to-be-sent file is in the user browsing state, division and packaging are performed; otherwise, division and packaging are not performed.

Step 2020: Divide and package the to-be-sent file.

Specifically, according to the determination of the step 2010, if the to-be-sent file is in the user browsing state, the current position of the to-be-sent file being browsed by the user is recorded, and the to-be-sent file is divided into a browsed part and a non-browsed part by using the current position of the to-be-sent file being browsed by the user as a point of division, where a part before the point of division corresponds to the browsed part, and a part after the point of division corresponds to the non-browsed part; otherwise, division and packaging are not performed on the to-be-sent file.

Step 2030: Send the to-be-sent file.

Specifically, the non-browsed part of the divided to-be-sent file of the receiving mobile terminal is sent, and after the sending of the non-browsed part is completed, the user is prompted that the sending of the non-browsed part of the to-be-sent file is completed and the browsed part of the divided to-be-sent file is not sent, and a prompt window of whether to send the browsed part of the to-be-sent file is generated.

According to a selection of the user, the transmission of the to-be-sent file is ended, or the browsed part of the to-be-sent file is sent and the transmission of the to-be-sent file is ended.

Figure 21:
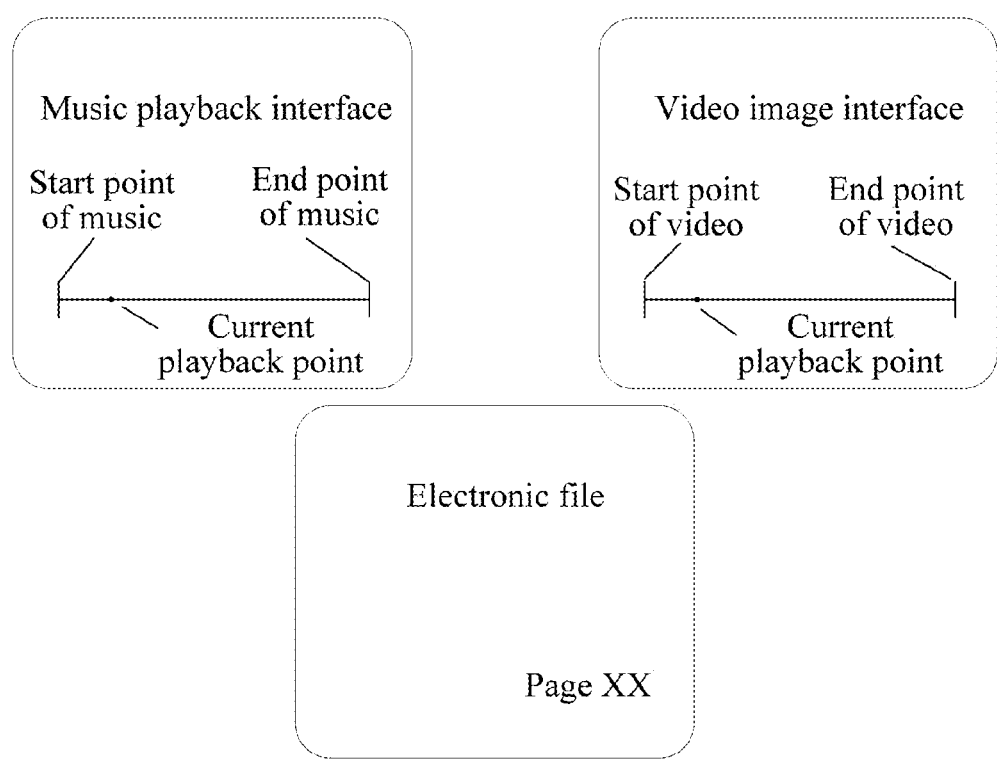
FIG. 21 is a diagram of using audio data, video data or an electronic file as a to-be-sent file disclosed in an embodiment of the present invention.

It should be noted that, in the foregoing embodiments, a picture is taken as the to-be-sent file. In actual applications, audio data, video data, or an electronic file may also be used as the to-be-sent file. FIG. 21 is a diagram of using audio data, video data or an electronic file as a to-be-sent file disclosed in an embodiment of the present invention. As shown in FIG. 21, the icon representing the to-be-transmitted file 1 in the foregoing embodiment may also be the audio data, the video data, or the electronic file. The audio data, the video data, or the electronic file all have a playing position point or a current page during playing or viewing, so no matter what method in the foregoing sending methods is adopted, those kinds of information is included in the audio data, the video data, or the electronic file, and therefore, when the data is transmitted to the receiving terminal, music or video may be played continuously from a reserved interruption position, or the electronic file may be read from a current page.

Figure 22:
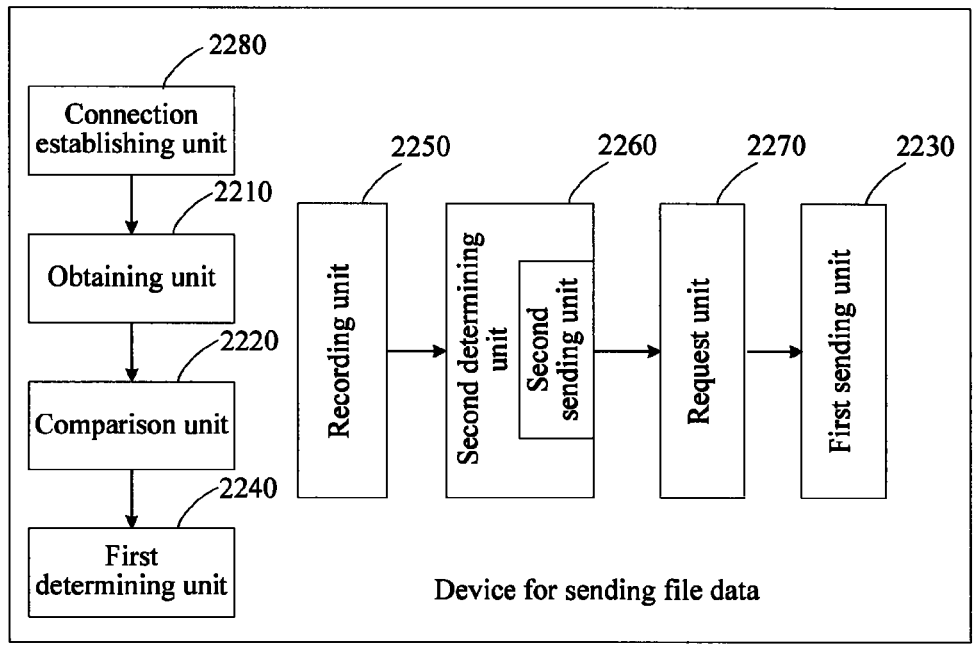
FIG. 22 is a diagram of a device for sending file data disclosed in an embodiment of the present invention.

FIG. 22 is a diagram of a device for sending file data disclosed in an embodiment of the present invention. As shown in FIG. 22, the device for sending file data disclosed in an embodiment of the present invention includes: an obtaining unit 2210 configured to obtain a shift that is relative to an initial position of a to-be-sent file and is generated when the representative to-be-sent file shifts in a display area; a comparison unit 2220 configured to determine whether a position of the to-be-sent file after the shift exceeds a preset position; and a first sending unit 2230 configured to: if the position of the to-be-sent file after shifting reaches or exceeds the preset position, send the to-be-sent file to a corresponding receiving terminal.

The obtaining unit in the device is specifically configured to obtain a touch input of the user; according to the touch input of the user, select the to-be-sent file and move the to-be-sent file; and obtain a position variation volume and position changing direction of the to-be-sent file, where the position variation volume and position changing direction are relative to the initial position of the to-be-sent file, so as to determine the shift of the to-be-sent file.

The obtaining unit in the device is further specifically configured to obtain a touch input of the user; select the to-be-sent file according to the touch input of the user, and move the mobile terminal, which provides the display, back and forth in opposite directions; and obtain a position variation volume and position changing direction of the to-be-sent file when the mobile terminal moves back and forth in opposite directions, where the position variation volume and position changing direction are relative to the initial position of the to-be-sent file in the display area and serve as the shift of the to-be-sent file.

The comparison unit in the device is specifically configured to determine whether an edge or a part inside the edge of the to-be-sent file reaches the edge of the display area of the mobile terminal.

The device further includes a first determining unit 2240 configured to determine whether a speed parameter value of the to-be-sent file exceeds a preset speed parameter value, and if the speed parameter value of the to-be-sent file exceeds the preset speed parameter value, send the to-be-sent file to the receiving terminal; otherwise, pop up an asking window to ask whether to send the to-be-sent file, or not send the to-be-sent file.

The device further includes a second determining unit 2260 configured to determine whether the to-be-sent file is in a user browsing state, if the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part, and the first sending unit in the device sends the non-browsed part of the divided to-be-sent file to the receiving terminal.

The second determining unit in the device further includes a second sending unit configured to, after the sending of the non-browsed part is completed, prompt the user that the sending of the non-browsed part of the to-be-sent file is completed and the browsed part of the divided to-be-sent file is not sent, and generate a prompt window of whether to send the browsed part of the to-be-sent file; and according to a selection of the user, end the transmission of the to-be-sent file, or send the browsed part of the to-be-sent file and end the transmission of the to-be-sent file.

The device further includes a request unit 2270 configured to analyze and select a receiving terminal, and send, to the receiving terminal, information of requesting the sending of the to-be-sent file.

The device further includes a connection establishing unit 2280 configured to sense a file operation action of moving the selected to-be-sent file to an edge of a display screen that displays the selected to-be-sent file; search for and select a receiving terminal according to the sensed file operation action of moving the selected to-be-sent file to the edge of the display screen that displays the selected to-be-sent file; send, to the selected receiving terminal, a message requesting establishment of a transmission connection; and according to the feedback of the selected receiving terminal to the message of establishing the transmission connection, establish a transmission connection with the receiving terminal, or reselect a receiving terminal until a transmission connection is established with the selected receiving terminal. Correspondingly, the sending the to-be-sent file to the corresponding receiving terminal specifically includes: sending the to-be-sent file to the receiving terminal that has established with the communication connection.

The device further includes: a recording unit 2250 configured to record a current position of the to-be-sent file being browsed by the user, and send the to-be-sent file to another mobile terminal, where the another mobile terminal receives the current position of the to-be-sent file, and the user continues to browse the to-be-sent file started from the current position of the to-be-sent file that is received by the another mobile terminal.

Figure 23:
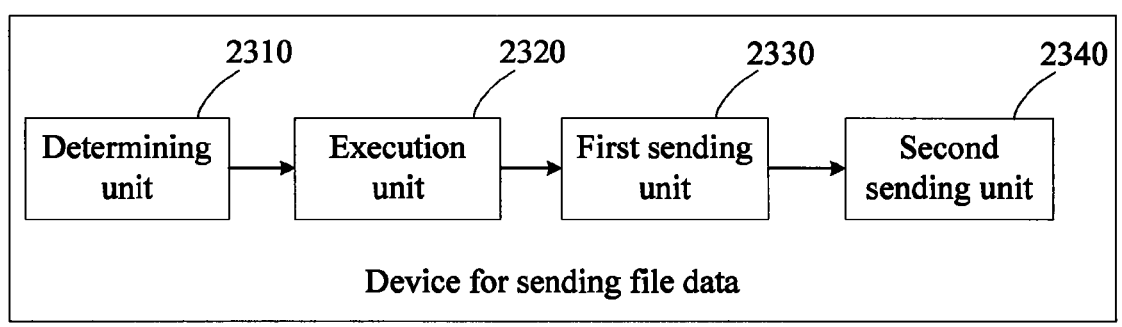
FIG. 23 is a diagram of another device for sending file data disclosed in an embodiment of the present invention.

FIG. 23 is a diagram of another device for sending file data disclosed in an embodiment of the present invention. As shown in FIG. 23, the device for sending file data disclosed in an embodiment of the present invention includes: a determining unit 2310 configured to determine whether a to-be-sent file is in a user browsing state; an execution unit 2320 configured to: if the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, where a part before the point of division corresponds to the browsed part, and a part after the point of division corresponds to the non-browsed part; and a first sending unit 2330 configured to send the non-browsed part of the divided to-be-sent file to a receiving terminal.

The device further includes a second sending unit 2340 configured to: after the sending of the non-browsed part is completed, prompt the user that the sending of the non-browsed part of the to-be-sent file is completed and the browsed part of the divided to-be-sent file is not sent, and generate a prompt window of whether to send the browsed part of the to-be-sent file; and according to a selection of the user, end the transmission of the to-be-sent file, or send the browsed part of the to-be-sent file and end the transmission of the to-be-sent file.

Those skilled in the art may further appreciate that, in combination with the examples described in the embodiments herein, units and algorithm steps can be implemented by electronic hardware, computer software, or a combination of the above two. To clearly describe the interchangeability between the hardware and the software, the foregoing has generally described compositions and steps of every embodiment according to functions. Whether the functions are executed by hardware or software depends on particular applications and design constraint conditions of the technical solutions. Person skilled in the art may use different methods to implement the described functions for every particular application, but it should not be considered that the implementation goes beyond the scope of the present invention.

The steps of a method or algorithm described in connection with the embodiments disclosed here may be embodied directly in hardware, in a software module executed by a processor, or in a combination of the two. The software module may be located in a RAM, a computer memory, a ROM, an Electrically Programmable Read Only Memory (EPROM), an Electrically Erasable Programmable Read Only Memory (EEPROM), a register, a hard disk, a removable disk, a Compact Disc-Read Only Memory (CD-ROM), or any other storage media well-known in the art.

The objectives, technical solutions, and benefits of the embodiments of the present invention are described in detail above. Although the present invention is described in detail with reference to some embodiments, those embodiments are not intended to limit the protection scope of the present invention. Any modification, equivalent replacement, or improvement made to the embodiments of the present invention without departing from the spirit and principles of the present invention shall fall into the protection scope of the present invention.

What is claimed is:

1. A method for sending file data, comprising:
- obtaining a shift that is relative to an initial position of a to-be-sent file and is generated when a representative to-be-sent file shifts in a display area;
- determining whether a position of the to-be-sent file after the shift exceeds a preset position;
- sending the to-be-sent file to a corresponding receiving terminal when the position of the to-be-sent file after the shift reaches or exceeds the preset position;
- determining whether a speed parameter value of the to-be-sent file exceeds a preset speed parameter value;
- sending the to-be-sent file to the receiving terminal when the speed parameter value of the to-be-sent file exceeds the preset speed parameter value; and
- popping up a window to ask whether to send the to-be-sent file or to not send the to-be-sent file when the speed parameter value of the to-be-sent file does not exceed the preset speed parameter value.

2. The method for sending file data according to claim 1, wherein obtaining the shift that is relative to the initial position of the to-be-sent file and is generated when the representative to-be-sent file shifts in the display area comprises:
- obtaining a touch input of a user;
- selecting and moving the to-be-sent file according to the touch input of the user; and
- obtaining a position variation volume and position changing direction of the to-be-sent file, wherein the position variation volume and the position changing direction are relative to the initial position of the to-be-sent file to determine the shift of the to-be-sent file.

3. The method for sending file data according to claim 2, wherein the preset position is an edge of the display area of a mobile terminal, and wherein determining whether the position of the to-be-sent file after shifting exceeds the preset position comprises determining whether an edge or a part inside the edge of the to-be-sent file reaches the edge of the display area of the mobile terminal.

4. The method for sending file data according to claim 1, wherein obtaining the shift that is relative to the initial position of the to-be-sent file and is generated when the representative to-be-sent file shifts in the display area comprises:
- obtaining a touch input of a user;
- selecting the to-be-sent file according to the touch input of the user, and moving a mobile terminal, which provides the display, back and forth in opposite directions; and
- obtaining a position variation volume and a position changing direction of the to-be-sent file, wherein the position variation volume and the position changing direction are relative to an initial position of the to-be-sent file in the display area when the mobile terminal moves back and forth in opposite directions to determine the shift of the to-be-sent file.

5. The method for sending file data according to claim 1, further comprising:
- determining whether the to-be-sent file is in a user browsing state;
- when the to-be-sent file is in the user browsing state, recording a current position of the to-be-sent file being browsed by a user, and dividing the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part; and
- sending the non-browsed part of a divided to-be-sent file to the receiving terminal.

6. The method for sending file data according to claim 1, wherein before obtaining the shift that is relative to the initial position of the to-be-sent file and is generated when the representative to-be-sent file shifts in the display area, the method further comprises:
- sensing a file operation action of moving a selected to-be-sent file to an edge of a display screen that displays the selected to-be-sent file;
- searching for and selecting a receiving terminal according to the sensed file operation action of moving the selected to-be-sent file to the edge of the display screen that displays the selected to-be-sent file;
- sending, to the selected receiving terminal, a message for requesting establishment of a transmission connection;
- according to the feedback of the selected receiving terminal to the message of establishing the transmission connection, establishing a transmission connection with the receiving terminal, or reselecting a receiving terminal until a transmission connection is established with the selected receiving terminal, and
- wherein sending the to-be-sent file to the corresponding receiving terminal specifically comprises sending the to-be-sent file to the receiving terminal that has established with the communication connection.

7. The method for sending file data according to claim 1, wherein the to-be-sent file comprises a picture, audio data, video data, or an electronic file, wherein a current position of the to-be-sent file being browsed by a user is recorded, wherein the to-be-sent file is sent to another mobile terminal, wherein the another mobile terminal receives the current position of the to-be-sent file, and wherein the user continues to browse the to-be-sent file started from the current position of the to-be-sent file that is received by the another mobile terminal.

8. A method for sending file data, comprising:
- obtaining a shift that is relative to an initial position of a to-be-sent file and is generated when a representative to-be-sent file shifts in a display area;
- determining whether a position of the to-be-sent file after the shift exceeds a preset position;
- sending the to-be-sent file to a corresponding receiving terminal when the position of the to-be-sent file after the shift reaches or exceeds the preset position;
- determining whether the to-be-sent file is in a user browsing state;
- when the to-be-sent file is in the user browsing state, recording a current position of the to-be-sent file being browsed by a user, and dividing the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part;
- sending the non-browsed part of a divided to-be-sent file to the receiving terminal;
- after completing sending of the non-browsed part, prompting the user that the sending of the non-browsed part of the to-be-sent file is completed and the browsed part of the divided to- be-sent file is not sent, and generating a prompt window of whether to send the browsed part of the to-be-sent file; and according to a selection of the user, ending transmission of the to-be-sent file, or sending the browsed part of the to-be-sent file and ending the transmission of the to-be-sent file.

9. A method for sending file data, comprising:
determining whether a to-be-sent file is in a user browsing state;
when the to-be-sent file is in the user browsing state, recording a current position of the to-be-sent file being browsed by a user, and dividing the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part;
sending the non-browsed part of a divided to-be-sent file to a receiving terminal;
after completing sending of the non-browsed part, prompting the user that the sending of the non-browsed part of the to-be-sent file is completed and the browsed part of the divided to-be-sent file is not sent, and generating a prompt window of whether to send the browsed part of the to-be-sent file; and
according to a selection of the user, ending transmission of the to-be-sent file, or sending the browsed part of the to-be-sent file and ending the transmission of the to-be-sent file.

10. A device for sending file data, comprising:
a processor;
an obtaining unit configured to obtain a shift that is relative to an initial position of a to-be-sent file and is generated when a representative to-be-sent file shifts in a display area;
a comparison unit configured to determine whether a position of the to-be-sent file after the shift exceeds a preset position;
a first sending unit configured to send the to-be-sent file to a corresponding receiving terminal when the position of the to-be-sent file after shifting reaches or exceeds the preset position; and
a first determining unit configured to:
determine whether a speed parameter value of the to-be-sent file exceeds a preset speed parameter value;
send the to-be-sent file to the receiving terminal when the speed parameter value of the to-be-sent file exceeds the preset speed parameter value; and
pop up a window to ask whether to send the to-be-sent file or to not send the to-be-sent file when the speed parameter value of the to-be-sent file does not exceed the preset speed parameter value.

11. The device for sending file data according to claim 10, wherein the obtaining unit is specifically configured to:
obtain a touch input of a user;
select and move the to-be-sent file according to the touch input of the user; and
obtain a position variation volume and position changing direction of the to-be-sent file, wherein the position variation volume and the position changing direction are relative to an initial position of the to-be-sent file to determine the shift of the to-be-sent file.

12. The device for sending file data according to claim 11, wherein the preset position is an edge of the display area of a mobile terminal, and wherein the comparison unit is specifically configured to determine whether an edge or a part inside the edge of the to-be-sent file reaches the edge of the display area of the mobile terminal.

13. The device for sending file data according to claim 10, wherein the obtaining unit is further specifically configured to:
obtain a touch input of a user;
select the to-be-sent file according to the touch input of the user, and move the mobile terminal, which provides the display, back and forth in opposite directions; and
obtain a position variation volume and a position changing direction of the to-be-sent file, wherein the position variation volume and the position changing direction are relative to an initial position of the to-be-sent file in the display area when the mobile terminal moves back and forth in opposite directions to determine the shift of the to-be-sent file.

14. The device for sending file data according to claim 10, further comprising a second determining unit configured to determine whether the to-be-sent file is in a user browsing state, and when the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part, and wherein the first sending unit sends the non-browsed part of a divided to-be-sent file to the receiving terminal.

15. A device for sending file data, comprising:
a processor;
an obtaining unit configured to obtain a shift that is relative to an initial position of a to-be-sent file and is generated when a representative to-be-sent file shifts in a display area;
a comparison unit configured to determine whether a position of the to-be-sent file after the shift exceeds a preset position;
a first sending unit configured to send the to-be-sent file to a corresponding receiving terminal when the position of the to-be-sent file after shifting reaches or exceeds the preset position; and
a second determining unit configured to determine whether the to-be-sent file is in a user browsing state, and when the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part, and wherein the first sending unit sends the non-browsed part of a divided to-be-sent file to the receiving terminal, and
wherein the second determining unit comprises a second sending unit configured to, after completing sending of the non-browsed part, prompt the user that the sending of the non-browsed part of the to-be-sent file is completed and the browsed part of the divided to-be-sent file is not sent, and generate a prompt window of whether to send the browsed part of the to-be-sent file, and according to a selection of the user, end transmission of the to-be-sent file, or send the browsed part of the to-be-sent file and end the transmission of the to-be-sent file.

16. The device for sending file data according to claim 10, wherein the device further comprises a request unit configured to analyze and select a receiving terminal, and send, to the receiving terminal, information of requesting sending the to-be-sent file.

17. The device for sending file data according to claim 16, wherein the device further comprises a connection establishing unit configured to:
    sense a file operation action of moving a selected to-be-sent file to an edge of a display screen that displays the selected to-be-sent file;
    search for and select a receiving terminal according to the sensed file operation action of moving the selected to-be-sent file to the edge of the display screen that displays the selected to-be-sent file;
    send, to the selected receiving terminal, a message requesting establishment of a transmission connection;
    according to the feedback of the selected receiving terminal to the message of establishing the transmission connection, establish a transmission connection with the receiving terminal, or reselect a receiving terminal until a transmission connection is established with the selected receiving terminal, and
    wherein the processing of the first sending unit sending the to-be-sent file to the corresponding receiving terminal specifically comprises sending the to-be-sent file to the receiving terminal that has established with the communication connection.

18. The device for sending file data according to claim 10, wherein the to-be-sent file comprises a picture, audio data, video data, or an electronic file, wherein the device further comprises a recording unit configured to record a current position of the to-be-sent file being browsed by a user, and send the to-be-sent file to another mobile terminal, wherein the another mobile terminal receives the current position of the to-be-sent file, and the user continues to browse the to-be-sent file started from the current position of the to-be-sent file that is received by the another mobile terminal.

19. A device for sending file data, comprising:
    a processor;
    a determining unit configured to determine whether a to-be-sent file is in a user browsing state;
    an execution unit configured to, when the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part;
    a first sending unit configured to send the non-browsed part of a divided to-be-sent file to a receiving terminal; and
    a second sending unit configured to, after completing sending of the non-browsed part, prompt the user that the sending of the non-browsed part completed and the browsed part of the divided to-be-sent file is not sent, and generate a prompt window of whether to send the browsed part of the to-be-sent file, and according to a selection of the user, end transmission of the to-be-sent file, or send the browsed part of the to-be-sent file and end the transmission of the to-be-sent file.

* * * * *

UNITED STATES PATENT AND TRADEMARK OFFICE
CERTIFICATE OF CORRECTION

PATENT NO. : 8,850,364 B2
APPLICATION NO. : 14/029980
DATED : September 30, 2014
INVENTOR(S) : Dongyuan Li et al.

It is certified that error appears in the above-identified patent and that said Letters Patent is hereby corrected as shown below:

In the Claims

Column 18 lines 39-Column 19 line 4 Claim 8 should read:

A method for sending file data, comprising:
obtaining a shift that is relative to an initial position of a to-be-sent file and is generated when a representative to-be-sent file shifts in a display area;
determining whether a position of the to-be-sent file after the shift exceeds a preset position;
sending the to-be-sent file to a corresponding receiving terminal when the position of the to-be-sent file after the shift reaches or exceeds the preset position;
  determining whether the to-be-sent file is in a user browsing state;
when the to-be-sent file is in the user browsing state, recording a current position of the to-be-sent file being browsed by a user, and dividing the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part;
sending the non-browsed part of a divided to-be-sent file to the receiving terminal;
  after completing sending of the non-browsed part, prompting the user that the sending of the non-browsed part of the to-be-sent file is completed and the browsed part of the divided to-be-sent file is not sent, and generating a prompt window of whether to send the browsed part of the to-be-sent file; and
  according to a selection of the user, ending transmission of the to-be-sent file, or sending the browsed part of the to-be-sent file and ending the transmission of the to-be-sent file.

Column 19 lines 29-51 Claim 10 should read:

A device for sending file data, comprising:
  an obtaining unit configured to obtain a shift that is relative to an initial position of a to-be-sent file and is generated when a representative to-be-sent file shifts in a display area;

<div style="text-align:center">
Signed and Sealed this
Thirteenth Day of January, 2015

Michelle K. Lee
*Deputy Director of the United States Patent and Trademark Office*
</div>

CERTIFICATE OF CORRECTION (continued)
U.S. Pat. No. 8,850,364 B2 a comparison unit configured to determine whether a position of the to-be-sent file after the shift exceeds a preset position;
a first sending unit configured to send the to-be-sent file to a corresponding receiving terminal when the position of the to-be-sent file after shifting reaches or exceeds the preset position; and a first determining unit configured to: determine whether a speed parameter value of the to-be-sent file exceeds a preset speed parameter value; send the to-be-sent file to the receiving terminal when the speed parameter value of the to-be-sent file exceeds the preset speed parameter value; and pop up a window to ask whether to send the to-be-sent file or to not send the to-be-sent file when the speed parameter value of the to-be-sent file does not exceed the preset speed parameter value.

Column 20 lines 29-66 Claim 15 should read:

A device for sending file data, comprising:
an obtaining unit configured to obtain a shift that is relative to an initial position of a to-be-sent file and is generated when a representative to-be-sent file shifts in a display area;
a comparison unit configured to determine whether a position of the to-be-sent file after the shift exceeds a preset position;
a first sending unit configured to send the to-be-sent file to a corresponding receiving terminal when the position of the to-be-sent file after shifting reaches or exceeds the preset position; and
a second determining unit configured to determine whether the to-be-sent file is in a user browsing state, and when the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part, and wherein the first sending unit sends the non-browsed part of a divided to-be-sent file to the receiving terminal, and wherein the second determining unit comprises a second sending unit configured to, after completing sending of the non-browsed part, prompt the user that the sending of the non-browsed part of the to-be-sent file is completed and the browsed part of the divided to-be-sent file is not sent, and generate a prompt window of whether to send the browsed part of the to-be-sent file, and according to a selection of the user, end transmission of the to-be-sent file, or send the browsed part of the to-be-sent file and end the transmission of the to-be-sent file.

Column 22 lines 6-29 Claim 19 should read:

A device for sending file data, comprising:
a determining unit configured to determine whether a to-be-sent file is in a user browsing state;
an execution unit configured to, when the to-be-sent file is in the user browsing state, record a current position of the to-be-sent file being browsed by a user, and divide the to-be-sent file into a browsed part and a non-browsed part by using the current position of the to-be-sent file being browsed by the user as a point of division, wherein a part before the point of division corresponds to the browsed part, and a part after the point of division corresponds to the non-browsed part;
a first sending unit configured to send the non-browsed part of a divided to-be-sent file to a receiving terminal;

and a second sending unit configured to, after completing sending of the non-browsed part, prompt the user that the sending of the non-browsed part of the to-be-sent file is completed and the browsed part of the divided to-be-sent file is not sent, and generate a prompt window of whether to send the browsed part of the to-be-sent file, and according to a selection of the user, end transmission of the to-be-sent file, or send the browsed part of the to-be-sent file and end the transmission of the to-be-sent file.